(12) United States Patent
Mäkiharju

(10) Patent No.: US 11,780,533 B2
(45) Date of Patent: Oct. 10, 2023

(54) AIR LAYER AND HYDROPHOBIC DRAG REDUCTION AND PREFERENTIAL GUIDANCE AND RECOVERY OF GAS WITH ENGINEERED SURFACES

(71) Applicant: The Regents of the University of California, Oakland, CA (US)

(72) Inventor: Simo A. Mäkiharju, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 139 days.

(21) Appl. No.: 17/266,550

(22) PCT Filed: Aug. 7, 2019

(86) PCT No.: PCT/US2019/045550
§ 371 (c)(1),
(2) Date: Feb. 5, 2021

(87) PCT Pub. No.: WO2020/101769
PCT Pub. Date: May 22, 2020

(65) Prior Publication Data
US 2021/0309321 A1 Oct. 7, 2021

Related U.S. Application Data

(60) Provisional application No. 62/715,639, filed on Aug. 7, 2018.

(51) Int. Cl.
*B63B 1/38* (2006.01)
(52) U.S. Cl.
CPC .......... *B63B 1/38* (2013.01); *B63B 2001/387* (2013.01)

(58) Field of Classification Search
CPC ..... B63B 1/38; B63B 2001/387; F15D 1/008; F15D 1/06; F15D 1/12; Y02T 70/10
See application file for complete search history.

(56) References Cited

U.S. PATENT DOCUMENTS

| 5,476,056 A | 12/1995 | Tokunaga et al. |
| 7,997,221 B2 | 8/2011 | Costas |
| 2005/0061221 A1 | 3/2005 | Paszkowski |
| 2013/0269589 A1 | 10/2013 | Kapteijn |

FOREIGN PATENT DOCUMENTS

| WO | WO-199928180 A1 | 6/1999 |

OTHER PUBLICATIONS

Butuzov, A. et al., "State of art in investigations and development for the ship on the air cavities," International Workshop on Ship Hydrodynamics, China, 1999, pp. 1-14.
(Continued)

*Primary Examiner* — Anthony D Wiest
(74) *Attorney, Agent, or Firm* — Mintz Levin Cohn Ferris Glovsky and Popeo, P.C.

(57) ABSTRACT

Disclosed herein are a method and a system for forming an air layer over a portion of an engineered surface, wherein the air layer is formed with a reduced flux and preferentially steering gas away from, or toward, a specific location by way of a hydrophobic surface, a hydrophilic surface, and/or a structured surface. Moreover, disclosed are a method and a system for recovering or separating a portion of the gas or other fluid layer.

19 Claims, 19 Drawing Sheets

(56) References Cited

OTHER PUBLICATIONS

Ceccio, S.L. et al., "A Review of Electrical Impedance Techniques for the Measurement of Multiphase Flows," Journal of Fluids Engineering, vol. 118, Jun. 1996, pp. 391-399.

Choi, K.S. European drag-reduction research—recent developments and currect status,: Fluid Dynamics Research 26 (2000), pp. 325-335.

Du, P. et al. "Maintenance of air layer and drag reduction on superhydrophobic surface", Ocean Engineering, vol. 130, pp. 328-335, Dec. 10, 2016 (Dec. 10, 2016).

Elbing, B.R. et al., "Bubble-induced skin-friction drag reduction and the abrupt transition to air-layer drag reduction," Journal of Fluid Mechanics, vol. 612, Oct. 2008, pp. 201-236.

Elbing, B.R. et al., "On the scaling of air layer drag reduction," Journal of Fluid Mechanics, vol. 717, Feb. 2013, pp. 484-513.

George, D.L. et al., "Measurement of the Bubbly Flow Beneath Partial Attached Cavities Using Electrical Impedance Probes," Journal of Fluids Engineering, vol. 122, Mar. 2000, pp. 151-155.

Gose, J. W. et al., "Characterization of superhydrophobic surfaces for drag reduction in turbulent flow," Journal of Fluid Mechanics, 845, 2018, pp. 560-580.

Hoang, C.L. et al., "Full scale experiment for frictional resistance reduction using air lubrication method," Proceedings of the 19th International Offshore and Polar Engineering Conference, 2009.

Kodama, Y. et al., "Experimental study on microbubbles and their applicability to ships for skin friction reduction," International Journal of Heat and Fluid Flow, vol. 21, Issue 5, Oct. 2000, pp. 582-588.

Latorre, R., "Ship hull drag reduction using bottom air injection," Ocean Engineering, vol. 24, Issue 2, Feb. 1997, pp. 161-175.

Lay, K.A. et al., "Partial cavity drag reduction at high Reynolds numbers," Journal of Ship Research, vol. 54, No. 2, Jun. 2010, pp. 109-119.

Madavan, N.K. et al., "Measurements of local skin friction in a microbubble modified turbulent boundary layer," Journal of Fluid Mechanics, vol. 156, Jul. 1985, pp. 237-256.

Makiharju, S.A et al., "On the energy economics of air lubrication drag reduction," International Journal of Naval Architecture and Ocean Engineering, vol. 4, Issue 4, Dec. 2012, pp. 412-422.

Makiharju, S.A. et al., "On the scaling of air entrainment from a ventilated partial cavity," Journal of Fluid Mechanics, vol. 732, Oct. 2013, pp. 47-76.

Makiharju, S.A. et al., "The topology of gas jets injected beneath a surface and subject to liquid cross-flow," Journal of Fluid Mechanics, vol. 818, May 2017, pp. 141-183.

Mizokami, S. et al., "Experimental study of air lubrication method and verification of effects on actual hull by means of sea trial," Mitsubishi Heavy Industries Technical Review, vol. 473, No. 3, Sep. 2010, pp. 41-47.

Monkewitz, P.A. et al., "Self-consistent high-Reynolds-number asymptotics for zero-pressure-gradient turbulent boundary layers," Physics of Fluids, vol. 19, Issue 11, Nov. 2007.

Rothstein, J. P., "Slip on superhydrophobic surfaces," Annual Review of Fluid Mechanics, vol. 42, Jan. 2000, pp. 89-109.

Seo, J. et al., "On the scaling of the slip velocity in turbulent flows over superhydrophobic surfaces," Physics of Fluids, vol. 28, Issue 2, Feb. 2016.

Tretheway, D. C. et al., "Apparent fluid slip at hydrophobic microchannel walls," Physics of Fluids, vol. 14, Issue 3, Mar. 2002.

Watanabe, K. et al., "Drag reduction of Newtonian fluid in a circular pipe with a highly water-repellent wall," Journal of Fluid Mechanics, vol. 381, Feb. 1999, pp. 225-238.

Wojdyla, A. et al., "New assessment criteria for durability evaluation of highly repellent surfaces," Wear, vol. 390391, Nov. 2017, pp. 49-60.

Extended European Search Report issued in European Application No. 19884853.3-1012, dated Apr. 7, 2022, 8 pages.

International Search Report and Written Opinion issued in PCT/US2019/045550, dated Jun. 5, 2020, 10 pages.

Plate fixed at 15° toward camera and 28° to the left

AIR LAYER AND HYDROPHOBIC DRAG REDUCTION AND PREFERENTIAL GUIDANCE AND RECOVERY OF GAS WITH ENGINEERED SURFACES

CROSS-REFERENCE TO RELATED APPLICATIONS

This application is a national stage application, filed under 35 U.S.C. § 371, of International Patent Application No. PCT/US19/45550, filed on Aug. 7, 2019, which claims the benefit of U.S. Provisional Application Ser. No. 62/715,639, filed on Aug. 7, 2018, each of which is incorporated by reference herein in its entirety.

FIELD

The subject matter described herein relates to, among other things, drag reduction, damping pressure pulsations on a hull caused by passing blades, reducing the amount of gas sucked into cooling water inlets (by re-directing or recovering all or a portion of the gas), recovering some of the gas, and/or other situations where guiding trajectory of entrained or injected gas on surfaces immersed in liquid can be beneficial.

BACKGROUND

Frictional drag accounts for approximately 60% of the propulsive power requirement for a vessel, such as a cargo ship and/or the like. As such, technologies that can reduce a ship's frictional resistance can save energy by reducing the consumption of fossil fuels, reduce emissions into the environment, and/or reduce the cost of operating the vessel.

SUMMARY

In some example embodiments, there may be provided a system including an engineered surface and an air layer formed over at least a portion of the engineered surface, wherein the air layer is formed with a reduced gas flux caused by a hydrophobic layer over at least a portion of the engineered surface. The system may further include an inlet on the engineered surface, the inlet recovering a portion of the air layer, a plenum coupled to the inlet to collect the portion of the air layer recovered by the inlet, and a channel coupled to an output of the plenum and coupled to an input of an air injector configured to inject at least the portion of the air layer formed with the reduced gas flux caused by the hydrophobic layer over at least the portion of the engineered surface.

In some variations, one or more of the features disclosed herein, including the following features, can optionally be included in any feasible combination. The reduced gas flux may be formed at a gas flux that is less when compared to a surface not having hydrophobic properties. The engineered surface may be a microscopic structure, a macroscopic structure, and/or coating to provide a hydrophobic surface. The air layer may be a continuous air layer, a patchy air layer, and/or a bubbly layer. The engineered surface may be hydrophilic, hydrophobic and/or super hydrophobic. The surface may be configured on a ship's hull below the water line, an inlet, on a fin, in a duct, a propeller, and/or another propulsor. The surface may be located at a pipe, an inlet, a tank, in and/or on turbine blades, and/or other surfaces, or other portion of a chemical plant and/or a power plant. The surface may be flat. The surface may be curved.

The system may further include a drain at the plenum for draining liquid from inside the plenum. A latch adjacent to the inlet, the latch, when lowered into the air layer over at least the portion of the engineered surface, may increase a pressure of the air, in the air layer, being recovered by the inlet. The inlet may include a slot, a pore, a groove, and/or a hole. The inlet may include hydrophobic and/or hydrophilic surfaces. The channel may be coupled to an input of an air tank, the air tank storing at least a portion of the air layer recovered by the inlet. The channel may route, at least a portion of the air layer recovered by the inlet, to the air injector based on a difference in a pressure at the plenum and a pressure at the air injector. The channel may route, by a fan, a blower, and/or a pump, to the air injector at least a portion of the air layer recovered by the inlet. A guide to steer the air layer away from, or toward, the inlet.

In another aspect, there is provided a method for forming an air layer over at least a portion of an engineered surface, wherein the air layer may be formed with a reduced gas flux caused by a hydrophobic layer over at least a portion of the engineered surface. The method may further include recovering a portion of the air layer via an inlet on the engineered surface, collecting the portion of the air layer, recovered by the opening, in a plenum coupled to the inlet, and routing at least a portion of the air layer, recovered by the inlet, via a channel coupled to an output of the plenum and coupled to an input of an injector configured to inject at least the portion of the air layer formed with the reduced gas flux caused by the hydrophobic layer over at least the portion of the engineered surface.

In some variations, one or more features disclosed herein including the following features can optionally be included in any feasible combination. The method may further include forming the reduced gas flux at a gas flux that is less when compared to a surface not having hydrophobic properties. The engineered surface may be a microscopic structure, a macroscopic structure, and/or a coating to provide a hydrophobic surface. The air layer may be a continuous air layer and/or a patchy air layer. The engineered surface may be hydrophilic, hydrophobic and/or super hydrophobic. The engineered surface may be configured on a ship's hull below the water line, an inlet, a fin, and/or a turbine blade, wherein the surface is located at a pipe, an inlet, a tank, or other portion of a chemical plant and/or a power plant. The engineered surface may be flat or curved.

In some variations, the method may further include draining liquid from inside the plenum via a drain at the plenum. The method may further include increasing a pressure of the air, in the air layer, being recovered by the inlet by lowering a latch, adjacent to the inlet, into the air layer over at least the portion of the engineered surface. The inlet may include a slot, a pore, a groove, and/or a hole. The inlet may include hydrophobic and/or hydrophilic surfaces. The method may further include storing, in an air tank, at least a portion of the air layer recovered by the inlet, an input of the air tank coupled to the channel. The method may further include routing, via the channel at least a portion of the air layer recovered by the inlet, to the air injector based on a difference in a pressure at the plenum and a pressure at the air injector. The channel may route, by a fan, a blower, and/or a pump, to the air injector at least a portion of the air layer recovered by the inlet. The method may further include configuring a guide to steer the air layer away from, or toward, the inlet.

In another aspect, there is provided an apparatus including means for forming an air layer over at least a portion of an engineered surface, wherein the air layer may be formed with a reduced gas flux caused by a hydrophobic layer over at least a portion of the engineered surface.

The above-noted aspects and features may be implemented partially or in any combination in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1A:
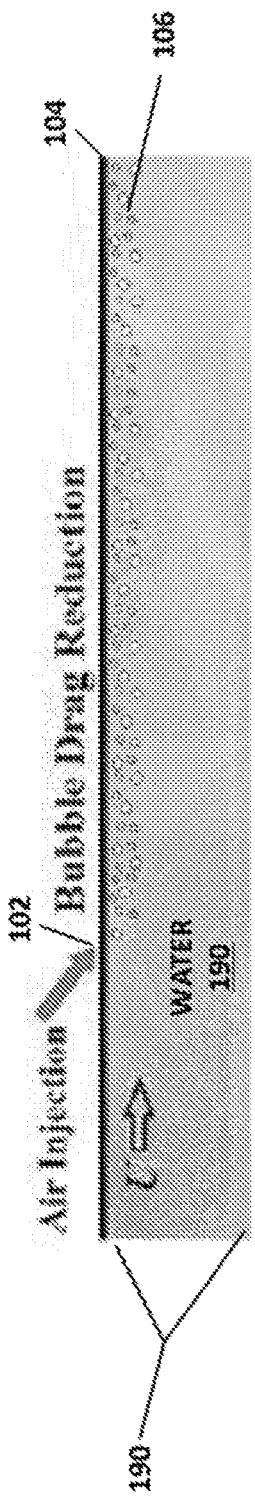
FIG. 1A-FIG. 1C depict drag reduction technologies related to the air layer.

Like labels are used to refer to same or similar items in the drawings.

DETAILED DESCRIPTION

In some example embodiments, there is provided a surface having air/gas layer (AL) drag reduction technology applied and a super hydrophobic surface (SHS) drag reduction technology. The terms "air" and "gas" may be used interchangeably in the discussions below, wherein "gas" may include a single or a mixture of suitable gases such as oxygen, nitrogen, carbon dioxide, and/or the like. Moreover, the term "hydrophobic" may indicate hydrophobic or super hydrophobic.

In some example embodiments, there is provided a method, a system, and/or an apparatus for preferential gas guidance to guide some of the air layer traversing over the surface.

In some embodiments, there is provided a method, a system, and/or an apparatus to recover some of the air layer traversing over the surface.

In some example embodiments, the surface (having the AL and SHS drag reduction technologies) may be the exterior of a vessel's hull portion making contact with the water.

In some example embodiments, the surface (having the AL and SHS drag reduction technologies) may be applied to at least one portion of the hull below the waterline of the vessel.

Although some of the examples described herein refer to SHS, other types of engineered surfaces may be used that can form a gas layer with reduced flux. For example, an engineered surface may have a hydrophobic surface that may form a gas layer with reduced gas flux when compared to a surface that does not have the hydrophobic surface.

Although some of the examples refer to an application on a ship's surface, the engineered surface to control gas flow or formation of layers technology described herein may be applied in other areas and/or surfaces as well. For example, a flow leading to a cooling water inlet may encounter an engineered surface designed to preferentially steer gas (be it discrete gas bubbles or air layers) away from the cooling water intake. An engineered surface may be used to increase gas present in a gap between hull and propeller, or in other regions where increased gas contents may be beneficial (e.g. for sound or thermal insulation). The technology described herein may also be used to control the direction of a flow (see, e.g., FIG. 13 below).

Similarly, the engineered surface to control gas flow or formation of layers technology disclosed herein may be used on other portions of a ship or in other industrial applications. For example, a flap, a rudder, a propeller, a wing, and/or other portions of a vessel may have the engineered surface to control gas flow or formation of layers technology applied. Furthermore, the surface upon which the technology is applied may be flat, curved, horizontal, inclined, and/or any other shape or orientation.

Air layer drag reduction technology provides an air (e.g. fresh air from ambient or the exhaust gas from a turbine) layer between a surface of a plate (which may be a portion of a ship's hull below the water line and making contact with the water) that can reduce frictional drag and/or improve thermal or sound insulation by providing, "air lubrication" between the plate and the water. Specifically, when air is injected over a surface of the plate at increasing rates, a transition in the topology may take place from a bubbly flow of air through the water medium to a continuous air layer enabling the frictional drag reduction (FDR). The frictional drag reduction may exceed about 80% in some instances, although lesser or greater amounts of frictional drag reduction may be realized as well. The amount of gas flux required to transition the air from a bubbly state, to a transitional state, and then to the layer drag reduction state may vary based on the implementations. For example, a gas flux of about half of that required on a plain painted hydraulically smooth surface may be sufficient to completely cover a plate in an air layer (e.g., in example embodiment at a Reynolds number in excess of 3 million).

Although the use of air layer (as well as bubbles and layers called films) drag reduction technology including macroscopic air layer technology has been used and is considered technically feasible, the economics of the use of air layer drag reduction technology alone have provided energy consumption savings only in the range of about 4% to 8% given the power consumption of the air compressor that generates the air layer.

Figure 1B:
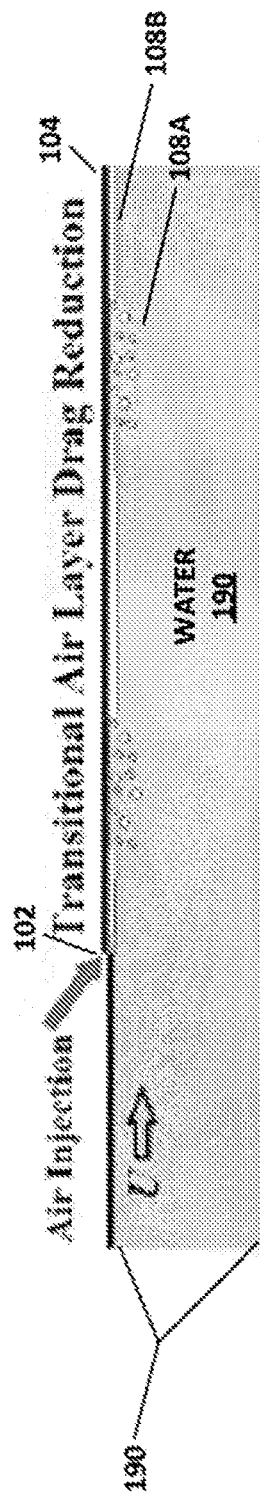
Figure 1C:
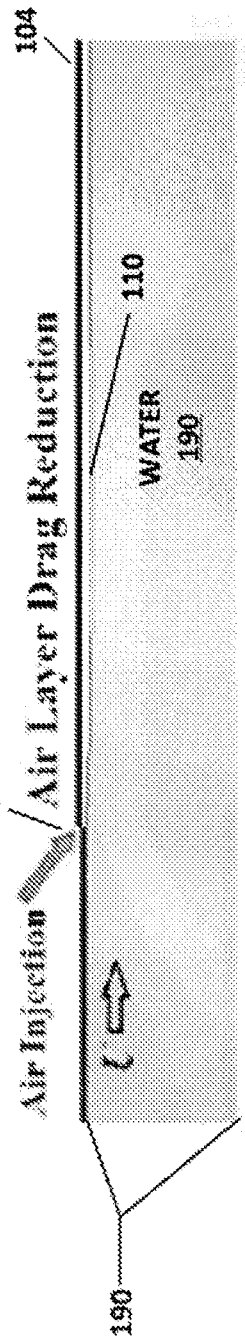

FIG. 1A-FIG. 1C depict drag reduction technologies related to the air layer.

Referring to FIG. 1A, the air (which is generated by an air compressor) is injected, at 102 below the surface plate 104, which makes contact with the water 190. In FIG. 1A, the bubble layer 106, as air lubrication, may provide some frictional drag reduction between the plate and the water (or the water's surface). FIG. 1B depicts a transitional air layer state which includes a bubble layer 108A and a transitional air layer 108B. In FIG. 1B, the bubble layer 108A and the transitional air layer 108B may provide some frictional drag reduction between the plate and the water (or the water's surface). FIG. 1C depicts the air layer drag reduction technology. When air is injected at 102 under plate 104, an air layer forms 110, which may provide some frictional drag reduction between the plate and the water (or the water's surface).

Referring again to FIG. 1C, when a gas such as air is injected at 102 beneath a horizontal plate 104, a transition in the topology can take place from a bubbly flow to a continuous gas layer 110, if the flux of injected air is increased beyond a threshold value, such as a critical value. The first indication of bubble coalescence and persistent of frictional drag reduction (which would be considered a frictional drag reduction in excess of about 20%) defines the beginning of the transitional air layer drag reduction regime. In this transitional region, the hull's surface is covered by interwoven regions of bubbly flow and segments of air layer (as shown in, for example, FIG. 1B). As the gas flux continues to be increased, the fraction of the hull's surface covered by clusters of fragmented air increases, until finally a continuous layer such as air layer 110 (as shown at FIG. 1C) covers the entire surface of the plate 104. Fully developed air layer drag reduction may be considered to be present when the persistent frictional drag reduction exceeds about 80%, although other amounts of reduction may be realized as well. To illustrate by way of an example for a full-scale ship, cargo ship, submarine, drone, and/or another type of water-going vessel or vehicle, the air layer used for air layer drag reduction may be about 1 centimeter thick, albeit for different application this may be orders of magnitude different.

Figure 2A:
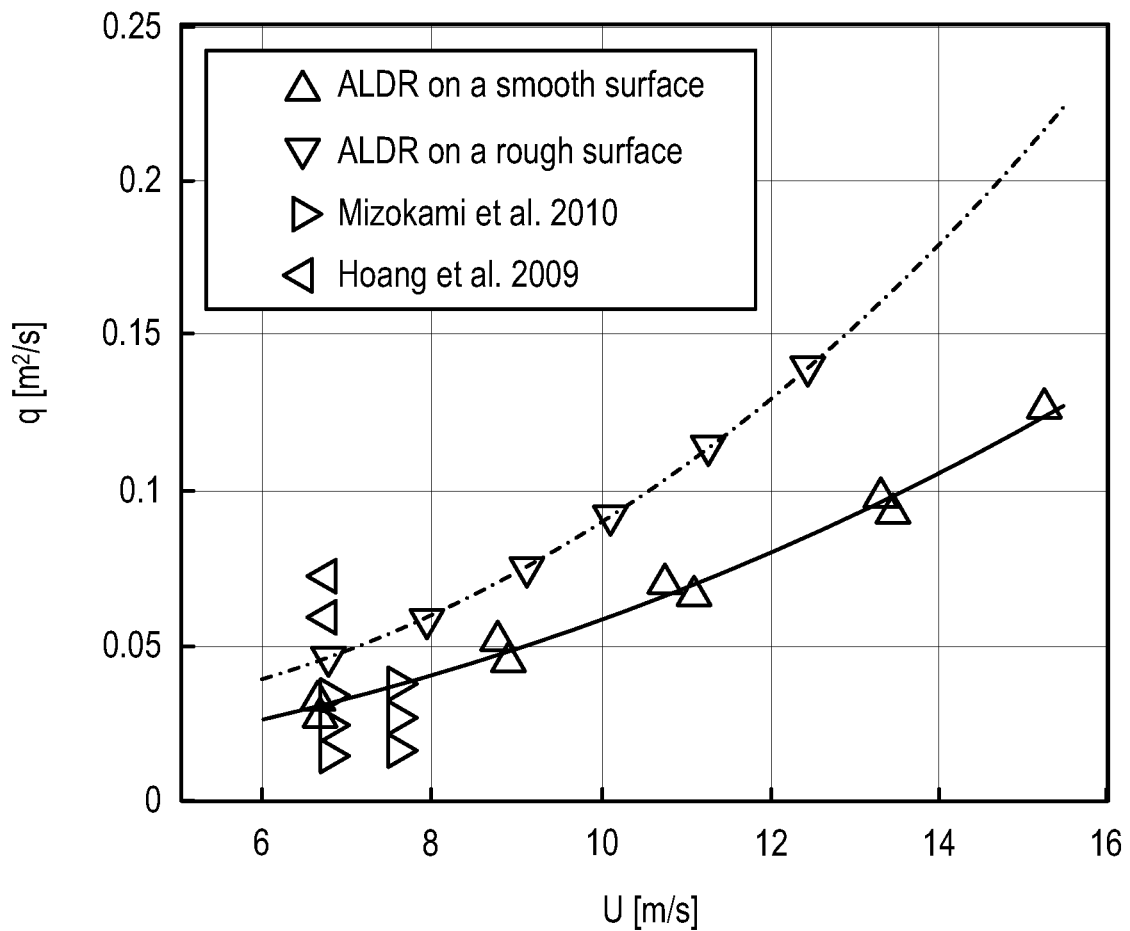
FIG. 2A depicts the approximate fluxes needed for air layer drag reduction on hydraulically smooth or rough surfaces.

FIG. 2A depicts the approximate fluxes needed for air layer drag reduction on smooth or rough surfaces. The vertical axis represents a minimum gas flux per unit of span divided by speed, q, as a function of the flow speed U of the plate through the water Thus, q is the volume flux (e.g., at draft pressure) of injected gas per unit span, and U is the free-stream speed. Flow over a rough surface requires a higher volumetric gas flux to achieve the same level of frictional drag reduction.

Figure 2B:
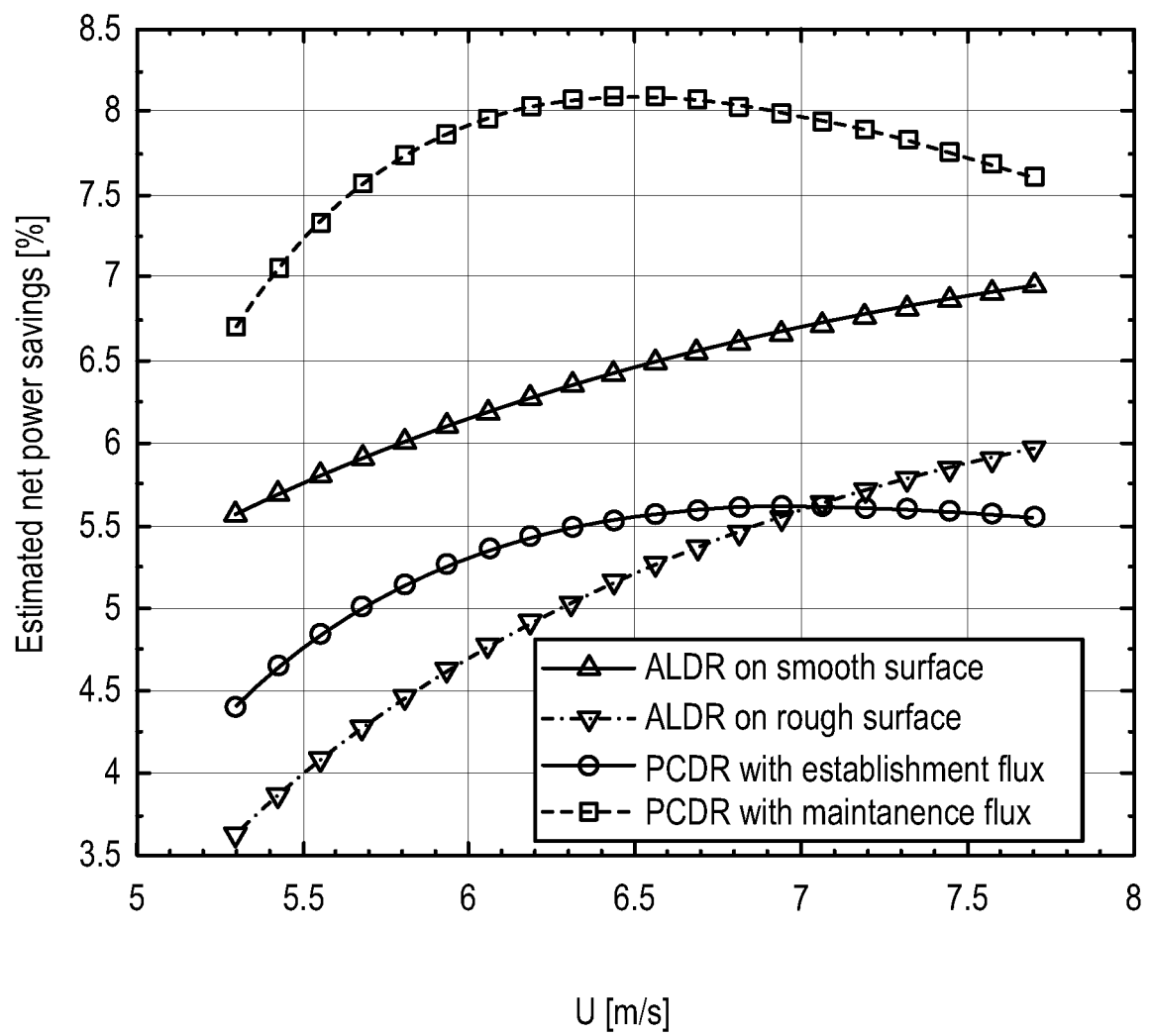
FIG. 2B depicts the predicted net power savings for air layers or partial cavities taking into account the energy required to generate the air flow over the surface of a sample ship's surface.

FIG. 2B shows the predicted net power savings that takes into account the energy required to generate the airflow over the surface of the plate. The net power savings may directly translate to reduced emissions by a ship. FIG. 2B predicts the saving for a 330 meter long cargo ship. See, e.g., Makiharju et al., (2012) "Energy Cost-Benefit Analysis of Air Lubrication Drag Reduction." J. of Naval Architecture and Ocean Engineering, v. 4, n. 4, pp. 412-422.

For more passive frictional drag reduction technology, a variety of techniques may be used. For example, the super hydrophobic surface (SHS) technology may, as noted, be used to provide frictional drag reduction. Super hydrophobic surface technology may be achieved based on the super hydrophobic surface's ability to trap a thin (e.g., about 30 micron) layer of gas such as air. This thin layer of surface gas may provide a "slip" (or "air lubrication") between the plate (which may be on the exterior surface of the ship's hull) as it traverses the liquid, such as water. For a laminar flow, super hydrophobic surfaces may provide significant frictional drag reduction. For turbulent flows such as those associated with a ship's hull, super hydrophobic surfaces may have mixed results.

Specifically, in the case of a super hydrophobic surface drag reduction in turbulent flows, the robustness of the air water interface may limit the frictional drag reduction. For frictional drag reduction technologies utilizing only super hydrophobic surfaces, the frictional drag reduction may be lost, if the thin air layer/pockets are removed due to entrainment, the gas-liquid interface is immobilized due to dirt, the super hydrophobic coating itself is damaged, or a combination of these. Also, there may be no drag reduction in the first place, if the surface contains a significant number of surface features protruding through the viscous air sublayer (e.g., surface features have k+>5, where k+ is the ratio of the average surface roughness to the air flows viscous length scale). The layer of air trapped on a super hydrophobic surface may be about 10-30 microns thick and comprised of discontinuous air pockets attached to the hydrophobic surface. Smoothness/roughness of the surface may depend on an application of the surface, wherein the roughness may be a natural roughness, a roughness resulting from use, a polishing or an addition of roughness. Moreover, the roughness of a surface may vary by sub-region of the natural and engineered surfaces.

Although some of the examples refer to SHS, other engineered surfaces having a certain degree of hydrophobicity may be used as well. The amount of hydrophobicity may be controlled by providing a microscopic structure, a macroscopic structure, and/or coatings, which may enable the formation of the continuous air layer. For example, the engineered surface may be composed of a combination of a structured surface and/or a coating having hydrophilic and hydrophobic properties. Furthermore, interfaces of, or gradients in, such surfaces can alter the path of gas by varying contact angle at gas-liquid-solid interface and hence affecting local force balances.

In some example embodiments, the air layer drag reduction technology may include an air layer compressor, which injects onto the surface of a plate (e.g., the ship's hull or other surface) a stable air layer, which can be maintained, and this surface is also coated with a super hydrophobic (or hydrophobic) surface coating. The use of the super hydrophobic surface coating enables the flux of the air layer to be lower when compared to a smooth surface. The unbroken air layer, although thinner than the air layer on a non-super hydrophobic surface, may have a significantly higher, local frictional drag reduction, when compared to a transitional air layer. This may reduce the air compressor's power consumption, as well as the size and cost of the required compressor, which may enable a significant improvement over the net power savings. As noted above, although some of the examples refer to the surface as having an SHS coating applied, other engineered surfaces having hydrophobic properties may be used as well to form the air (or gas) layer over the engineered surface.

Figure 3:
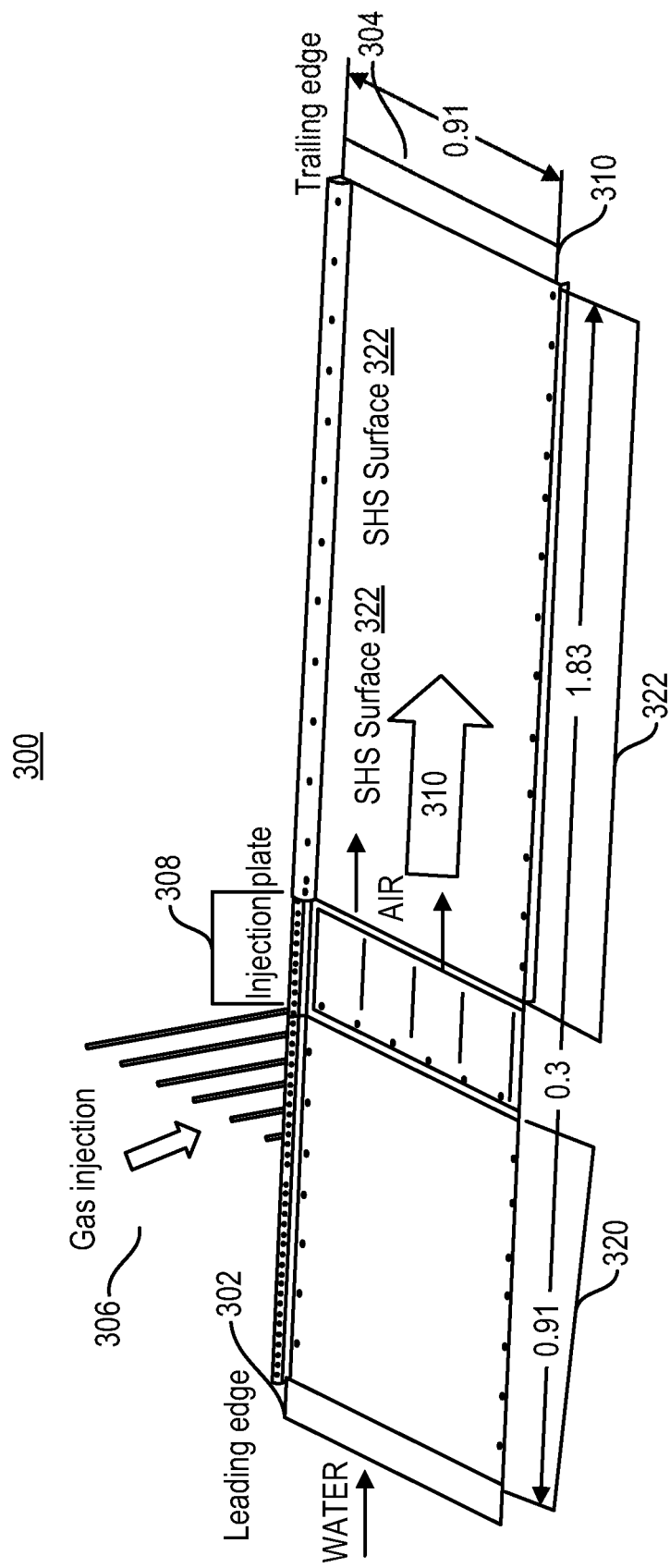
FIG. 3 depicts an example of a plate having an air layer drag reduction technology and super hydrophobic surface drag reduction technology, in accordance with some example embodiments.

FIG. 3 depicts an example of a plate 300, in accordance with some example embodiments. In the example of FIG. 3, the plate 300 represents a 3-meter long model of a ship's outer surface upon which air layer (AL) drag reduction technology and super hydrophobic surface (SHS) drag reduction technology are applied, in accordance with some example embodiments. The example of FIG. 3 is merely an example as the drag reduction technology disclosed herein may be applied to other surfaces including those not associated with a ship.

FIG. 3 depicts the bottom surface of the plate 300, which would be the outer portion of the ship's hull making contact with the water. The inner surface of the plate 300 would be oriented toward the interior of the hull. Although FIG. 3 depicts a plate 300 of a given size, this is merely for illustration as the plate can be implemented over larger or smaller areas, such as on the surface of a vessel, such as a ship and/or the like.

The first portion 320 (which in this example is about 1 meter) of the plate 300 was provided in the proof-of-concept experiments to enable boundary layer development and the last portion 322 of the plate represents the test surface where the air layer is formed over the super hydrophobic surface coating. For the super hydrophobic surface coating, it may be implemented in a variety of ways. For example, a coating of Cytonix, Naisol, Never Wet (commercially available from NeverWet, LLC) or other commercially available or developmental coatings may be applied to realize the super hydrophobic surface coating, although other techniques may be used to provide hydrophobicity of the surface (e.g., a micro structure, a macrostructure, and/or a surface coating) to smoothen or roughen regions of the surface. For example, the engineered surface may correspond to a smooth surface having micro or nano particles to make it hydrophobic, such as SHS. Alternatively or additionally, the engineered surface may correspond to a rough surface and then coated to make the surface hydrophobic, such as SHS. A source of air, such as an air compressor or air tank, may provide the air.

For the air layer, a gas such as air is injected at 306 and generates, via the injection plate 308, an air layer 310 emanating from the injection plate 308 and traversing to the trailing edge 304 over the super hydrophobic surface coating over the last portion 322 of the plate. As such, the generated air layer 310 traverses over the super hydrophobic surface at 322. Given a threshold amount of gas flux, the air layer forms over the super hydrophobic surface—providing thus frictional drag reduction between the plate and the water.

Although FIG. 3 depicts an example of an injector plate, the air may be introduced over the surface in other ways. For example, the air may be introduced over the surface using a slot in the hull of the ship, a porous material (which allows air to pass), and/or the like.

In the example of FIG. 3, the leading edge 302 may be configured with a 5 centimeter (cm) wide strip having randomly distributed 140 micron roughness elements to trip the boundary layer, although other sizes of strips may be implemented as well to trip the boundary layer. The portion 322 of the plate 300 downstream of the injection plate 308 may have a roughness of about 8±2 and <1 microns, with and without SHS coating, respectively. The bottom of the plate was at 0.6 m draft, although other values may be realized depending on the specific implementation.

Figure 4:
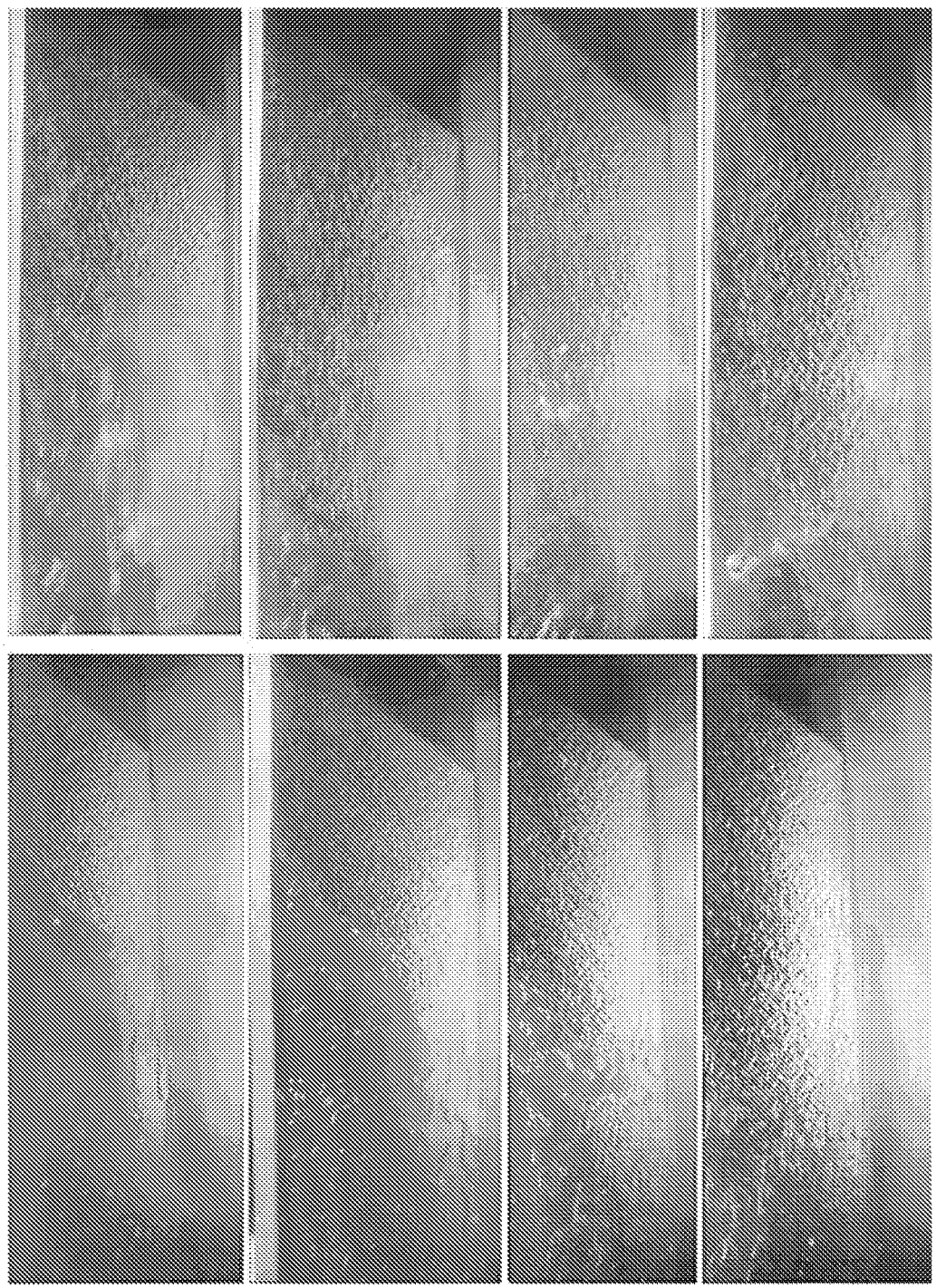
FIG. 4 depicts an example set of results for a plate having an air layer drag reduction technology and super hydrophobic surface drag reduction technology, in accordance with some example embodiments.

FIG. 4 depicts a picture of some results for a plate, such as plate 100 or 300 having an air layer (AL) drag reduction technology and super hydrophobic surface (SHS) drag reduction technology, in accordance with some example embodiments. FIG. 4 shows that a stable air layer may be maintained over a super hydrophobic surface, with a lesser gas flux when compared to a conventional smooth surface. The unbroken air layer, albeit thinner than that seen on a smooth surface, may provide a higher local drag reduction when compared to a transitional air layer.

Figure 5:
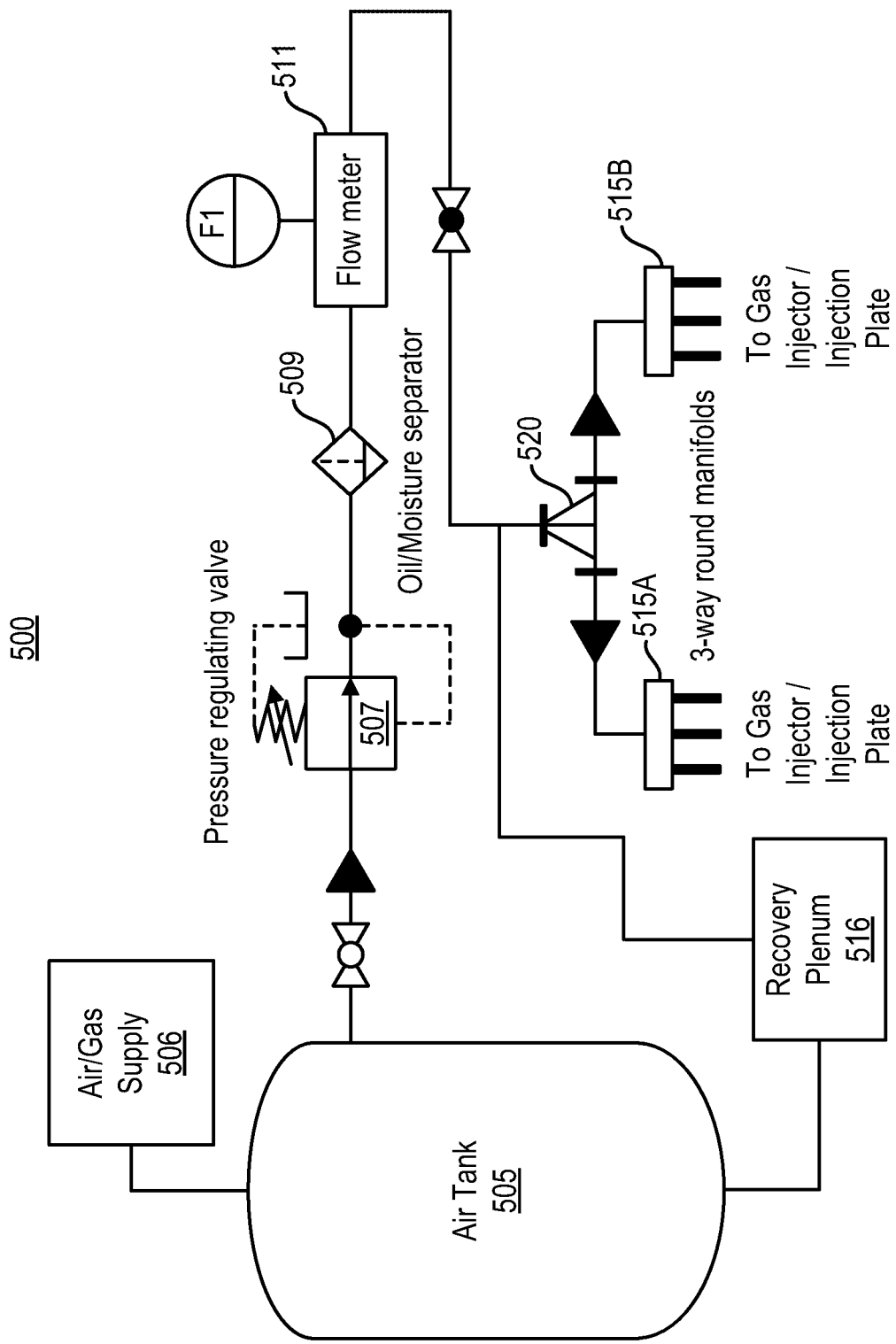
FIG. 5 depicts the example of a compressed air system for generating an air layer, in accordance with some example embodiments.

FIG. 5 depicts a compressed air system 500, in accordance with some example embodiments. The system 500 includes an air tank 505 (which may be filled with air), an air source 506 (e.g., pump, fan, or generator), the air tank coupled to a pressure regulator 507, a moisture separator 509, a flow meter 511, and manifolds 515A-B. The manifolds 515A-B couple to a gas injector, such as gas injector 306, which is further coupled to an injection plate, such as injection plate 308, configured to output an air layer. Moreover, the system 500 may include a recovery plenum 516, which may store and/or direct recovered air to the air tank 505 and/or to the manifolds 515A-B.

The system 500 may generate the air layer with strictly enforced symmetry at the pipe tee connection and identical pipe end downstream of the tee connection 520. In an example implementation, the compressed air in tank 505 stored 227 liters and passed through the regulator 507 (e.g., an SMC 7-125 psi non-relieving pressure regulator with a manufacturer specified accuracy of ±2.5%). The separator 509 was a Wilkerson modular filter for removal of oil, particulates, and moisture contamination down to 0.5 microns prior to flow measurement. The gas flow rate was measured by the flow meter 511 (e.g., an Alicat M-series, 0-1000 SLPM flow meter, with manufacturer specified accuracy of ±0.2% of full scale+0.8% of reading). Control valves may be used to adjust the amount of air injected through the piping.

Figure 6:
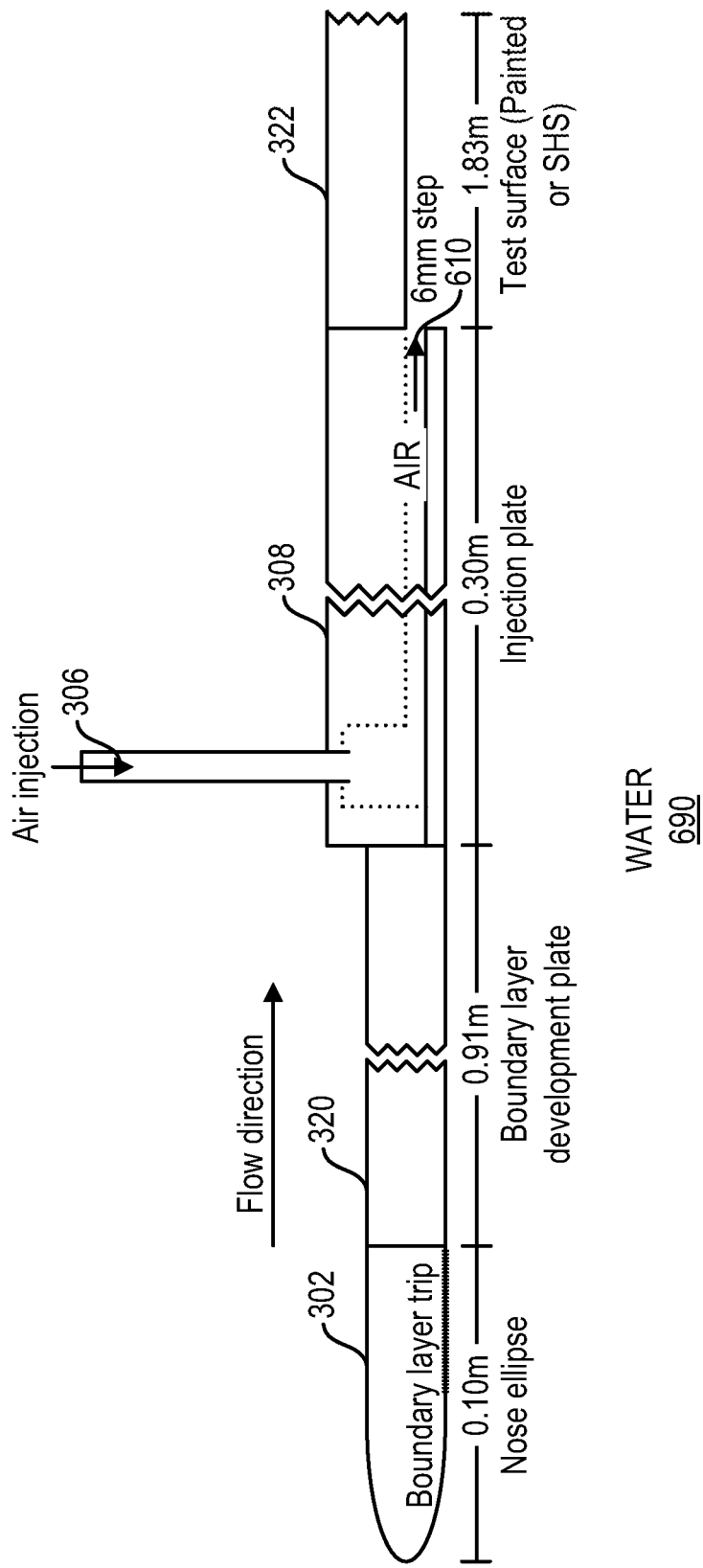
FIG. 6 depicts an example implementation of an air injection plate configured to provide an air layer over a surface of a plate having an air layer drag reduction technology and super hydrophobic surface drag reduction technology, in accordance with some example embodiments.

FIG. 6 shows an example implementation of the air injection plate 308, in accordance with some example embodiments. The air from the manifolds is fed to the injector 306 gas discharged out the back of the plate via a 0.8 m×0.32 cm injection slot on a 6 mm backward facing step 610 as shown. The dashed line indicates the air cavity machined from, for example, a PVC plate, although the injection plate may be formed using other materials including metals such as steel. To contain the air under and prevent it from leaking out the sides of the test section, PVC strakes may be installed on the side of the injection plate, extending 5.1 cm below the bottom of the test section. The injector 306 may be implemented, for example, as a series of holes or engineered injector ports.

For this example implementation, to compare the effectiveness of the commercial NeverWet coating, individual test areas of a second MIC-6 aluminum plate were sanded with varying grits and directions to examine the resulting water repelling properties based on different initial plate surface roughnesses. Following the manufacturer's instructions, two base coats of the coating were applied to the test surfaces, followed by four additional top coats.

Figure 7A:
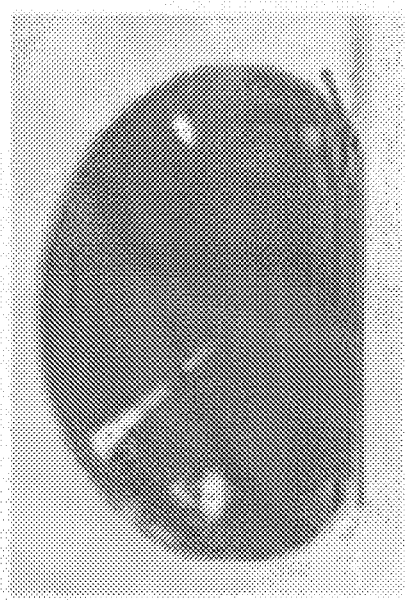
FIG. 7A-FIG. 7D depict images of results for four different surface preparations showing the effect of the super hydrophobic surface coating.
Figure 7B:
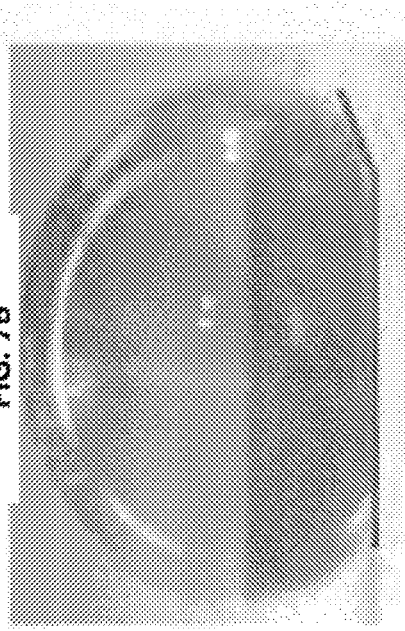
Figure 7C:
Figure 7D:
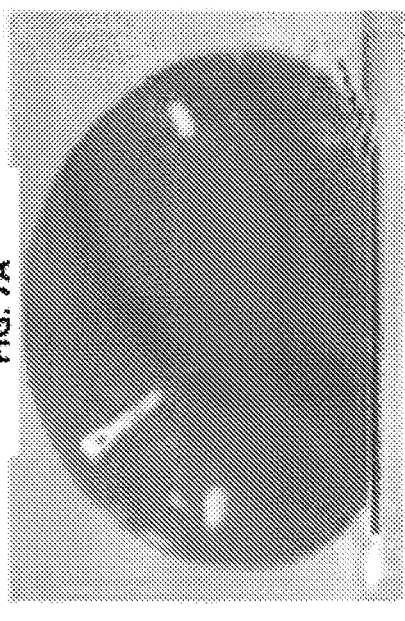

FIG. 7A-FIG. 7D show the gradient image results for four different examples of surface preparations using the SHS coating. The results showed the effectiveness of the Never-Wet commercial coating system is not measurably dependent on the roughness of the surface being applied to, so the hydrophobic surface can be applied to a surface that may be smooth or rough. FIG. 7A depicts 60 grit in the lateral direction; FIG. 7B depicts 150 grit in orbital direction; FIG. 7C depicts 2,000 grit in orbital direction; FIG. 7D depicts NeverWet directly applied with no surface preparation. At FIG. 7A-FIG. 7D water droplets measuring 0.1 mL and colored with red dye were deposited onto each test section.

Table 1 below shows the static contact angle for MIC-6 aluminum plate using various surface preparations techniques after application of two base coats and four top coats of NeverWet. In this example, the measurements had an uncertainty of ±3.0 degrees based on repeated contact angle measurements, and the measurements indicate the effectiveness of the NeverWet commercial coating system is not measurably dependent on the roughness of the surface being applied. Although some of the examples describe the engineered surface having a NeverWet coating applied, the engineered surface may have other types of surfaces having hydrophobic properties to enable formation of the air layer.

TABLE 1

| Grit | Direction of application | Static Contact angle |
| --- | --- | --- |
| | Painted plate | |
| None | N/A | 74.1 |
| | Superhydrophobic plate | |
| 60 | Lateral | 158.8 |
| 60 | Orbital | 157.4 |
| 150 | Lateral | 158.9 |
| 150 | Orbital | 157.2 |
| 220 | Lateral | 155.3 |
| 220 | Orbital | 157.9 |
| 400 | Lateral | 157.4 |
| 400 | Orbital | 158.1 |
| 800 | Orbital | 156.3 |
| 1000 | Orbital | 158.1 |
| 2000 | Orbital | 158.3 |
| None | N/A | 155.5 |

Electrical impedance based measurements of the void fraction of the air layer were made using two different probe configurations. The first probe configuration was located at the bow of the test surface plate and consisted of parallel wire probes suspended off the plate's surface. This configuration was located at the bow, 56.4 cm (21.5 in) aft of the air injection slot. Two 304 stainless steel wires of 0.05 mm (0.002 in) diameter were stretched across the plate's 91.4 cm (36 in) span. 0.8 mm thick tabs were laser cut from non-conductive Delrin sheets and installed across the plate's span at even intervals to ensure the wires were equally spaced 4 mm apart and remained 2.3 mm off the plate's surface. The stern electrical impedance wire probe configuration used an electrode pair placed directly on the surface. The probe was located near the plate's stern, at a distance of 156.2 cm (61.5 in) aft of the injection slot. In this case, two 304 stainless steel wires of 0.05 mm (0.002 in) diameter were affixed directly to the plate's surface using a double-sided adhesive strip approximately 10 mm (0.39 in) wide. The two spanwise electrodes were separated 4 mm apart. In both cases, the probe wires were connected to a shielded wire pair using screw terminals located outside the flow under the plate. Exposed wiring was waterproofed and sealed with silicone. The screw terminals, taking all load forces imposed on the signal wires during carriage running, avoided imparting any potential motion or oscillation to the probe wires. The signal wires were made as short as practical to reduce stray current and foil-shielded to minimize electromagnetic interference. The internal drain wire, as all instrumentation, was grounded to the building common ground carried to the tow tank carriage by an umbilical cable bundle that moved alongside the carriage. As used herein, internal flow refers to a flow contained in a channel or other cavity, while external flow refers to a flow not contained by a cavity or channel. An example of an external flow is a flow on a hull of a ship.

Figure 8:
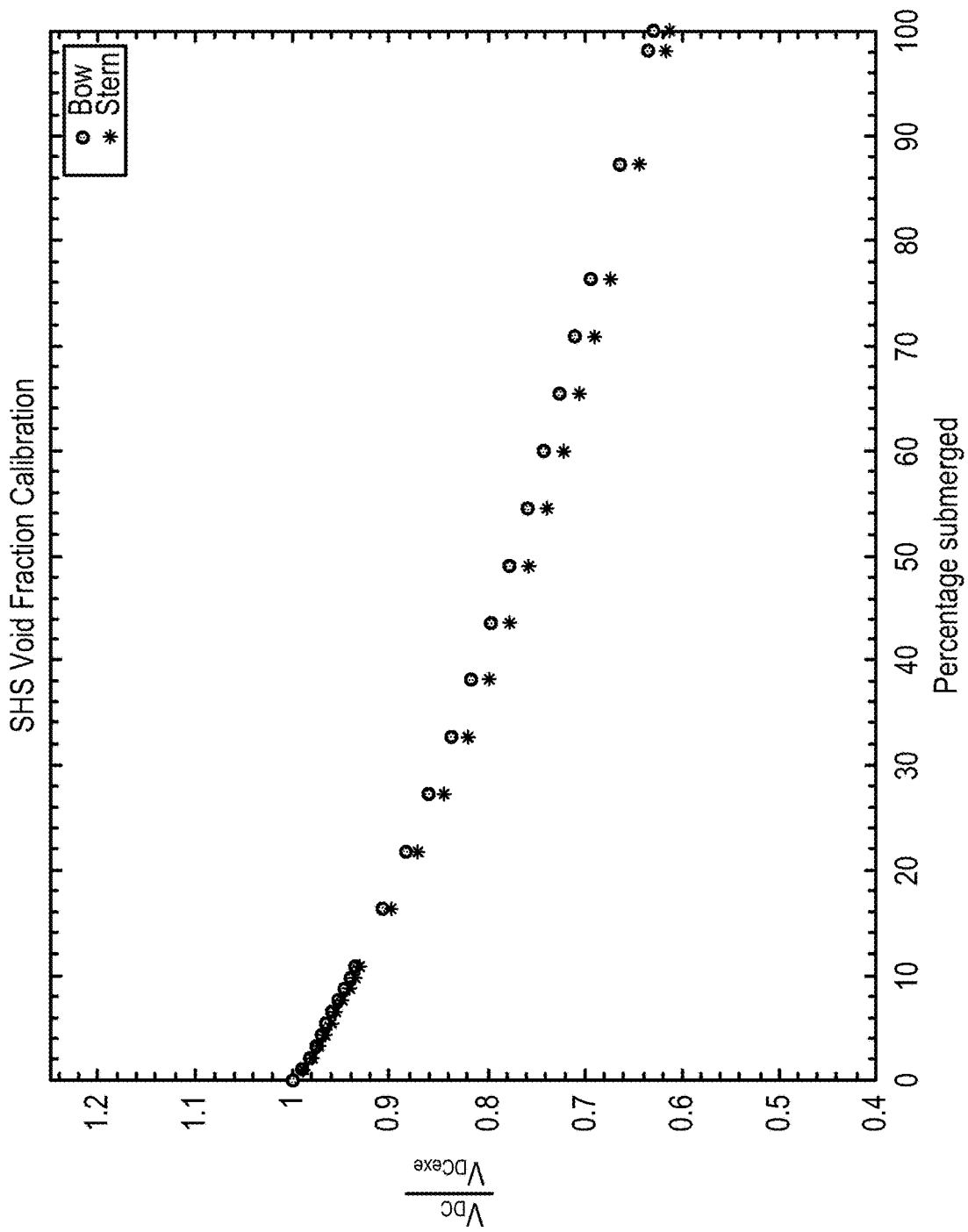
FIG. 8 depicts calibration curves of an electrical impedance sensor used to quantify air layer coverage on a plate having an air layer drag reduction technology and super hydrophobic surface drag reduction technology.

Calibration of the probes may be necessary to relate the measured signal to a void fraction. An example calibration curve was created using measured Vrms drops across each probe while varying the void fraction by known quantities and is shown in FIG. 8. Specifically, FIG. 8 plots an example calibration curve for the bow (left) and stern (right) impedance probes generated by from submerging the model (turned 90 degrees to its port side down) a known distance in water and measuring the Vrms value at steady submersion. The plate in the testing related to FIG. 8 was oriented such that the spanwise length was perpendicular to the water surface and submerged incrementally by known distances. Vrms readings were taken from 0% to 100% submersion. The Vrms drop measured was given ample time (minutes) to reach a steady state before recording as the process of lowering the model introduced an unwanted motion to the model and fluid surface disturbance. To ensure the accuracy of calibration, the Vrms measurements were taken with both probes ON, Bow OFF and Stern ON, and Bow ON Stern OFF.

The probes were calibrated for both the non-conductive painted surface and for the SHS in advance of data collection and re-calibrated after any changes to the model. During actual data collection, and with the assumption of a uniform bubbly mixture underneath the plate, recorded voltage drop was correlated with the calibration curve established for the surface type in order to estimate the void fraction at a given carriage velocity and air injection rate.

Using underwater cameras mounted below and at an oblique angle, videos of the flow under the plate were taken and compared at similar gas injection flux rates at the draft pressure for the SHS and painted plates. To ensure a similar aspect ratio between the two surfaces, each photo was captured as the injection slot aligned with the right side of the frame.

Figure 9A:
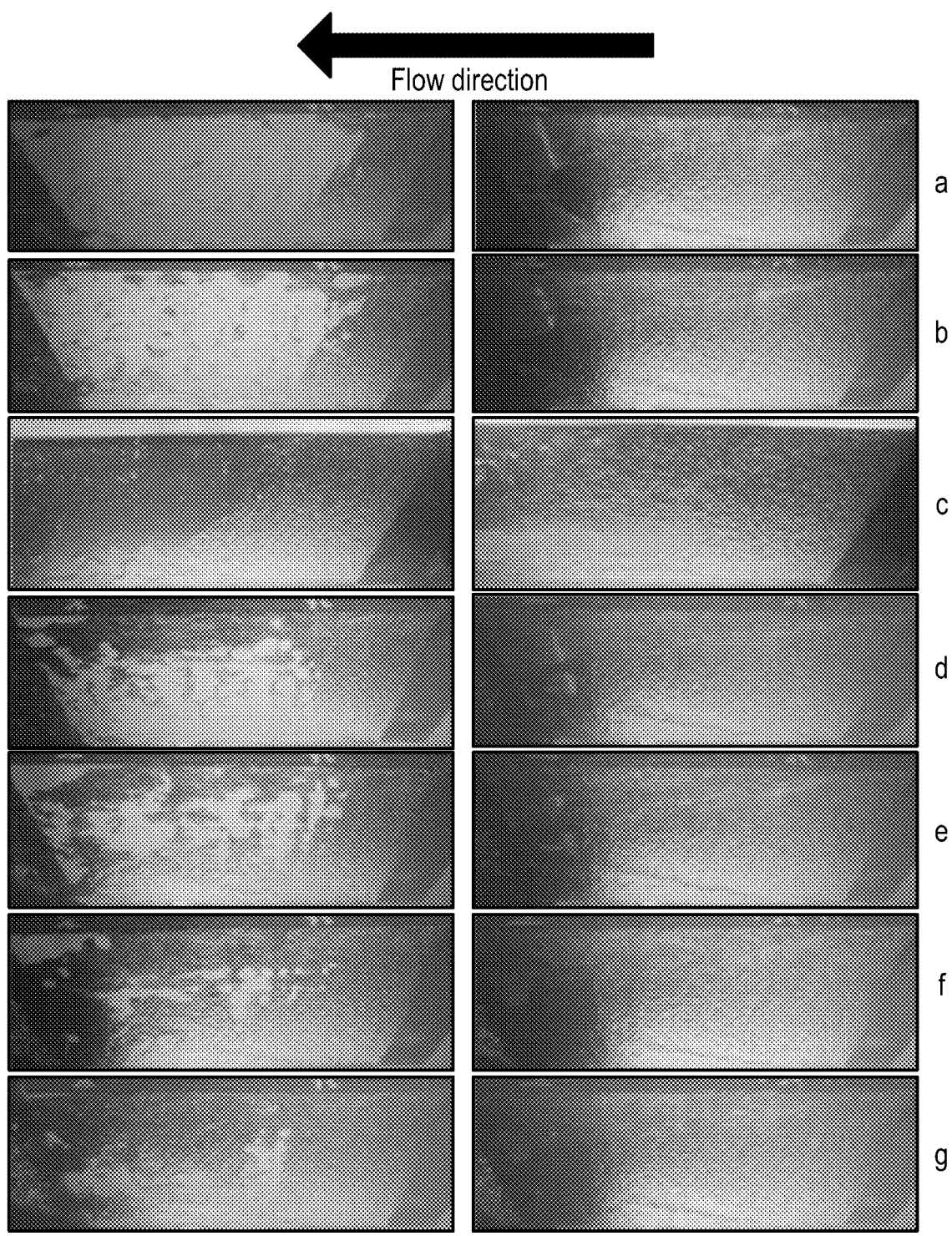
FIG. 9A-FIG. 9B depict examples of test results for varying air layer thickness.
Figure 9B:
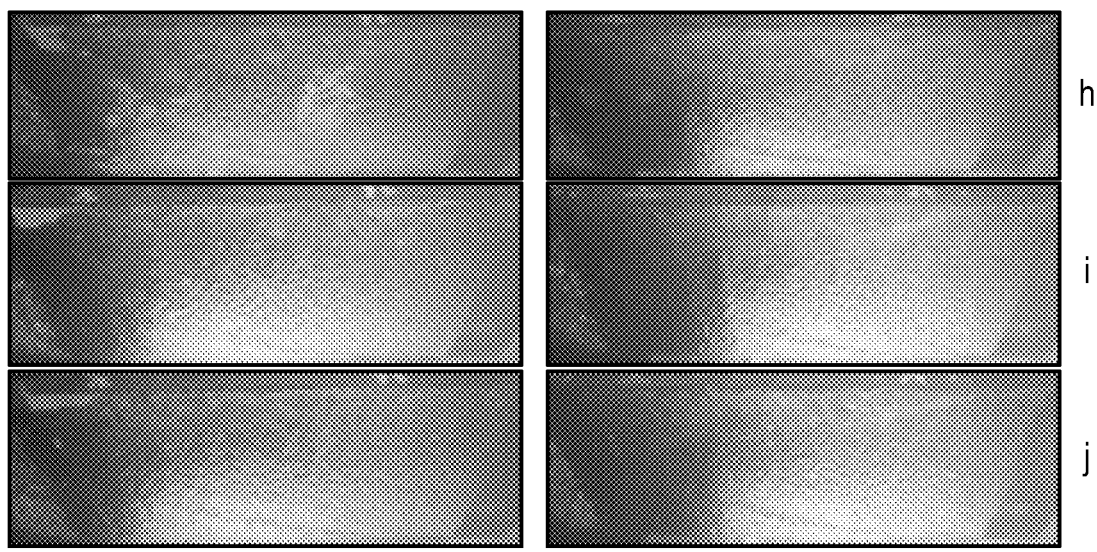

FIG. 9A-FIG. 9B depict examples of test results for varying air layer thickness, increasing from top to bottom, with a painted surface (not having hydrophobic properties) on the left and the SHS on the right. The rows from top to bottom show increasing injected gas flux, as evident coverage is more complete on the SHS pictures on the right. The nominal air layer thickness, $t_{AL}$ was defined (see, e.g., Elbing, et al., "Bubble-induced skin-friction drag reduction and the abrupt transition to air-layer drag reduction," Journal of Fluid Mechanics, Vol. 612, October 2008, pp. 201-236, (2008)) as:

$$t_{AL} = \frac{Q}{U_\infty S}. \tag{1}$$

Here, Q is volumetric flux at draft pressure, U∞ is free-stream velocity, and S the model span.

At FIG. 9A-FIG. 9B, the example results of spanwise uniform gas injection on painted, smooth aluminum surface without (left) and SHS (right) at $Re_L=5.1\times10^6$ and with gas flux corresponding to $t_{AL}=1.0$ (a), 1.5 (b), 1.8 (c), 2.1 (d), 2.8 (e), 3.9 (0, 4.9 (g), 6.1 (h), 6.4 (i), and 7.5 mm (j) for images from top to bottom. Each photo was taken when the injection slot was aligned with the right side of the image. The camera field of view is approximately 180 cm×59 cm for each $t_{AL}$, with the exception of (c), where the field of view is approximately 116 cm×46 cm. The flow is from right to left. From FIG. 9A-B, it is immediately clear that the required flux to form a stable AL at draft pressure is significantly less for a SHS than a non-SHS hydraulically smooth painted surface. Near the lowest flow rate measured corresponding to a $t_{AL}$ of 1.0 mm, the AL on the SHS extends nearly the entire 1.8 m length of the aluminum plate from the injection slot. The conical shape appearing more significant due to shallow angle of lighting, is due to the pressure perturbation originating from the leading edges of the strakes. The smooth, non-SHS painted surface at $t_{AL}\approx1$ mm, the AL (just a partial cavity forming off the backward facing step) covers only approximately 20% of the length of the plate, and is spread nearly uniform across the span of the plate. For increasing gas flux rates, the SHS plate continues to maintain steady AL coverage through the entire plate, while small patches of air-water interactions occur on the painted plate. Over the SHS, a patch-free AL forms over the entire plate when $t_{AL}$ is about 2.8 mm. On the painted plate, an AL forms when $t_{AL}$ about 6.4 mm, which is similar to the value predicted of $t_{AL}$ of about 6.5+/−0.5 mm, although values may vary based on the implementation.

Figure 10:
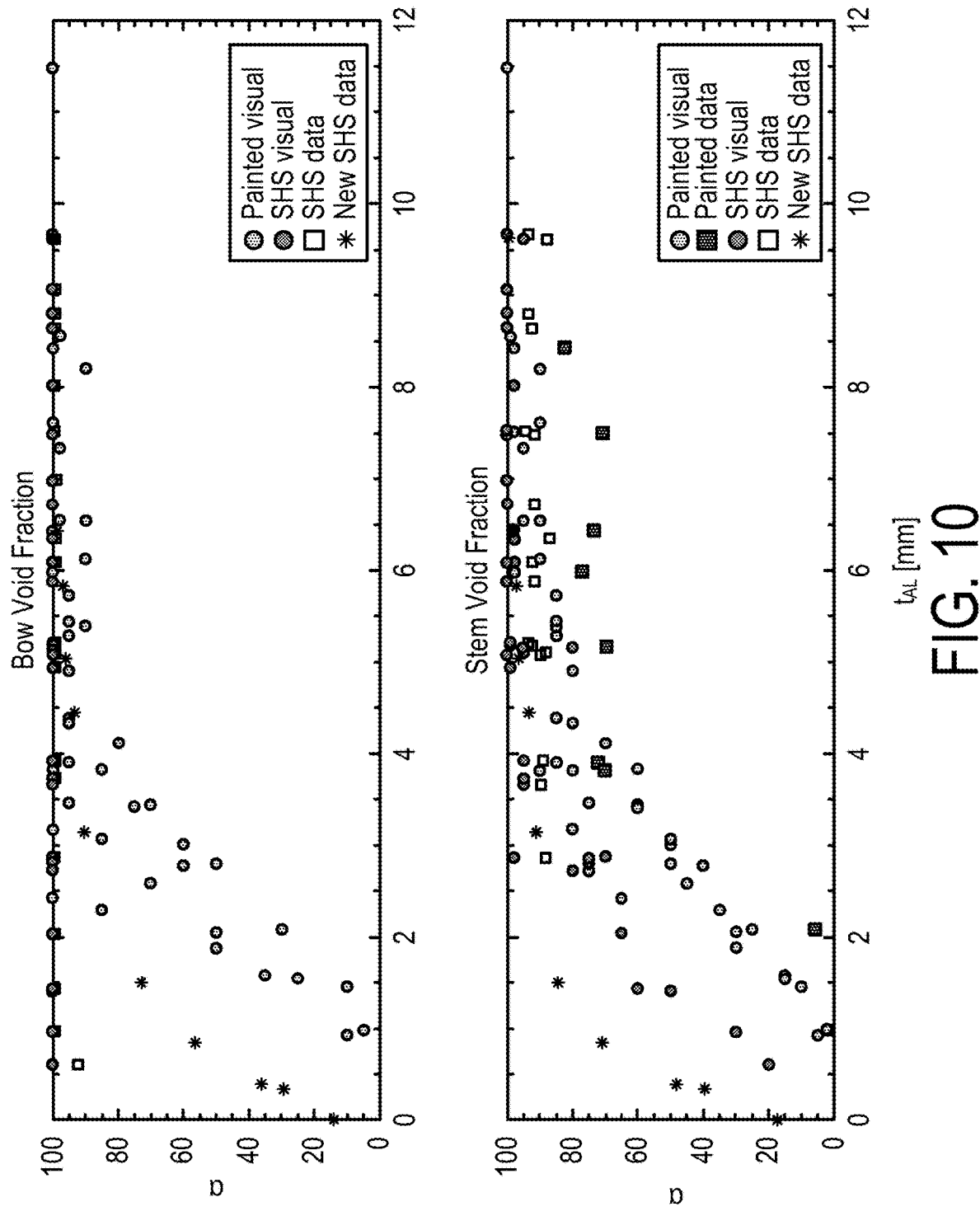
FIG. 10 depicts an example of test data for time-averaged void fraction data indicating increased continuous air coverage on a plate having an air layer drag reduction technology as a consequence of an application of the hydrophobic coating.
Figure 11:
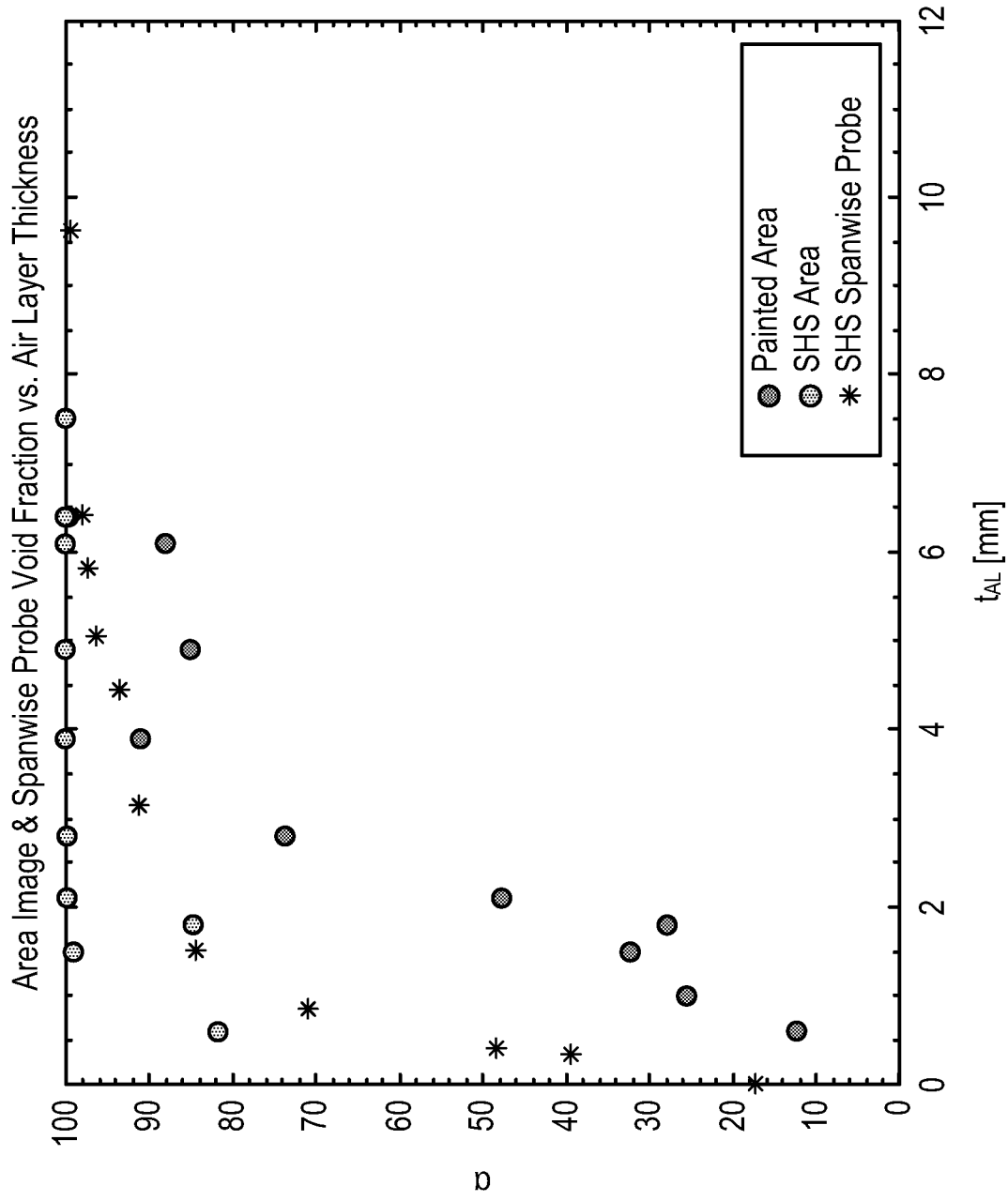
FIG. 11 depicts an example area void fraction test data indicating increased continuous air coverage on plate as a consequence of an application of the hydrophobic coating.

FIG. 10 displays the time-averaged void fraction data collected at the bow and stern locations, 54.6 cm and 156.2 cm aft of the injection slot, respectively, for the painted and SHS plate examples. The time-averaged data was collected when the carriage reached top speed and the air injection reached a steady state value. The impedance data collected from the stern probe shows a clear difference in the void fraction measured at given AL thicknesses for a SHS coating versus a painted surface. Nominal AL of $t_{AL}>3.8$ mm show a consistent reduction of gas flux requirement to a stable AL spanning the test surface for the SHS. In addition to electrical impedance measurements, image analysis of the spanwise and area void fraction were completed. Using an underwater camera looking directly underneath the model, the spanwise void fraction was estimated at both locations by examining the area of each measurement location over the video time frame, allowing for a better comparison to the void fraction data collected. As expected, these void fraction visual estimations increase as the gas flow rates increase. For the area void fraction estimations, a snapshot of a 101.6 cm×91.4 cm area near the trailing edge was evaluated as it passed over the camera. The results of this processing are shown in FIG. 11, which shows the area void fraction calculation based a 101.6 cm×91.4 cm area near the trailing edge of the model for the same $t_A$, described in FIG. 9A-B.

On the hydraulically smooth non-SHS painted MIC-6 aluminum surface, the gas flux required to form an air layer is in fair agreement, with the minimum required nominal layer thickness $t_{Aj}$, about 6±1 mm. However, on a SHS plate, a significantly lesser gas flux, $t_{Aj}$, about 3±1 mm, sufficed to achieve an air layer that persisted for the length of the model. Hence, a stable air layer can be formed on an SHS at a significantly reduced flux, when compared to a surface not having the hydrophobic surface. Thus, SHS-AL drag reduction may offer a drag reduction technique with improved net energy savings potential and reduced compressor and piping size requirements while also reducing the payback period on a retrofitted existing vessel.

Figure 12:
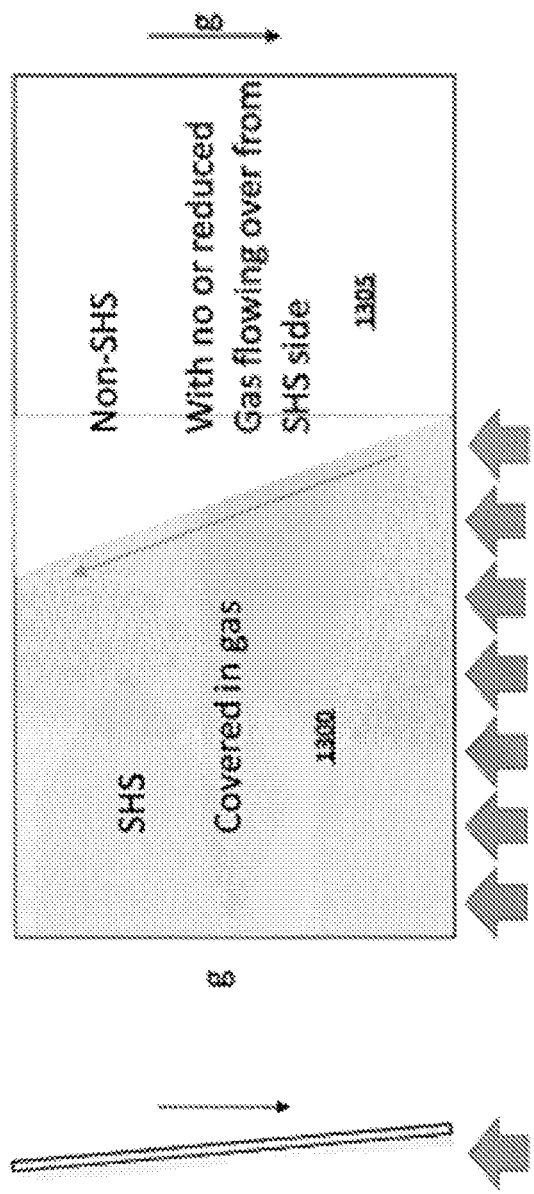
FIG. 12A, FIG. 12B, FIG. 13, and FIG. 14 depict flow steering, in accordance with some example embodiments.
Figure 13:
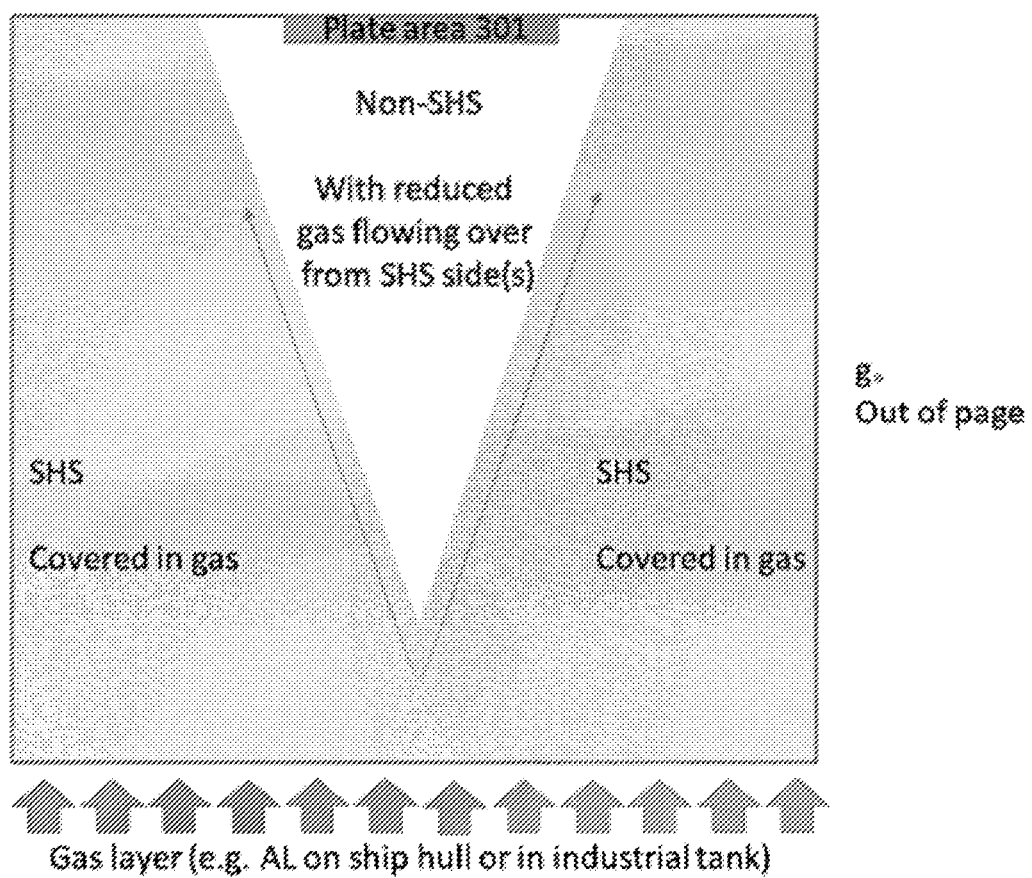

As noted above, the technology disclosed herein may be used to steer a flow toward (or away) from a location. FIG. 12A, FIG. 12B, and FIG. 13 describe the flow steering aspect.

FIG. 12A-FIG. 12B depicts steering the gas via a combination of hydrophobic (shaded region 1300) and uncoated surface (unshaded region 1305). Specifically, FIG. 12A is of an example implementation and shows a side view of a plate at an angle with respect to gravity, and FIG. 12B shows the plate of FIG. 12A looking at the surface of the plate. The gas (as depicted by the arrows) is injected along the full width of SHS region (shaded region 1300), with suitable contact angle, tilt angle and gas flux up to a limit. Similarly, hydrophobic, hydrophilic (to any varying degree), structured, and/or roughened surface may be used for similar effect of flat, angles, and/or curved surfaces. The amount of achievable steering may depend on, for example, phase contact angles and flow boundary layer. This can be used to, for example, preferentially steer gas away from cooling water intake on ship hull (or, for example, at an industrial plant or on other surfaces associated with, for example, a pump, turbine, mixer, propeller blades, and/or the like with non-condensable or condensable gas).

FIG. 13 depicts a flat plate horizontally placed in a flow where the gas covering the upstream surface would continue to flow toward area 301. If area 301 is to remain uncovered by gas layer, combination of one or combination of hydrophobic or hydrophilic (to any varying degree) or structured or roughened surface may be used for similar effect of flat, angles and/or curved surfaces may be used to steer gas (be it discrete bubbles or continuous layers) preferentially away from area 301. Although the previous example refers to a horizontal plate, the plate may have other orientations. Moreover, the flow may be internal or external. In any case, the engineered surface and AL may be used to control flow (e.g., reduce or increase) and, in particular, gas flowing to some region.

Figure 14:
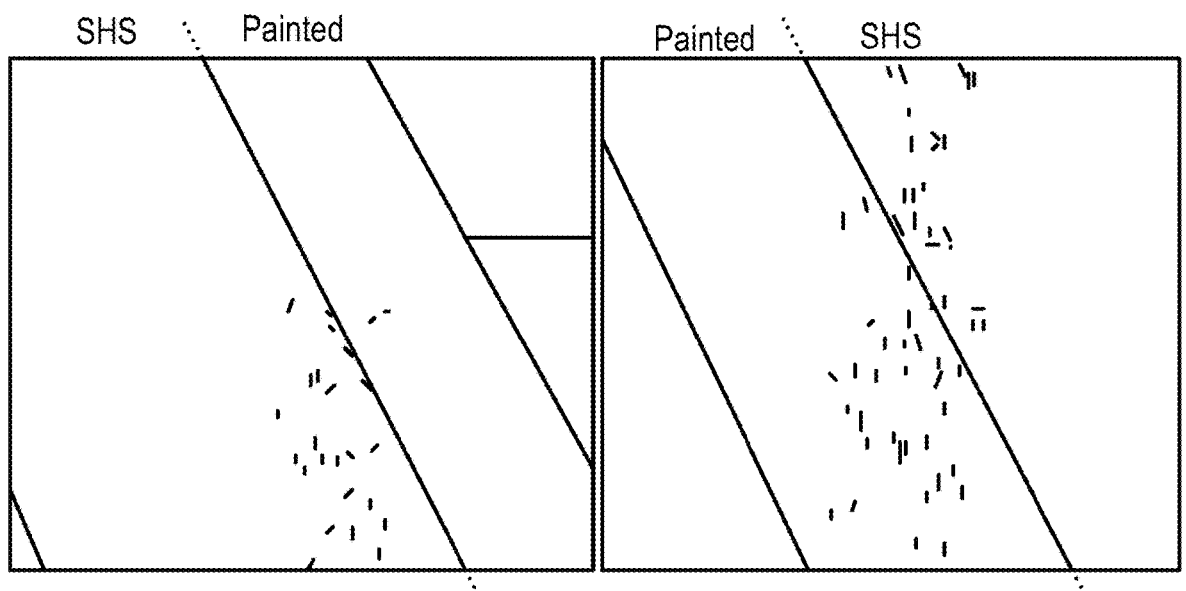

To demonstrate preferential gas steering, the left side of FIG. 14 shows the SHS surface separated by a dashed line and then the smooth, non-SHS surface. In this example, gravity points toward the bottom of the pictures. On the left plate, gas is steered sideways (away from the direction gravity alone would cause), and the same would also happen in a flow boundary layer.

In some embodiments, instead of allowing the gas/air to flow away, some of the gas may be recovered for reuse by the system 500 of FIG. 5. In some examples, the recovered gas may still be at an elevated pressure and able to be stored in the air tank 505, directed to the manifolds 515A-B, or to the tee connection 520 of the system 500. Returning the recovered gas to the system 500 may require less energy than pumping new/fresh gas into the air tank 505. Moreover, storing or reusing the recovered gas may reduce the size and the energy consumption of the air supply 506 as well as reduce the complexity and extent of the required piping in the system 500. The recovery of a portion or all of gas may also be desirable, for example, to prevent entrainment in the propulsor, or to remove gas from industrial piping. An ALDR or SHS-ALDR system including gas recovery and recycling features may be referred to as ReALDR.

Figure 15:
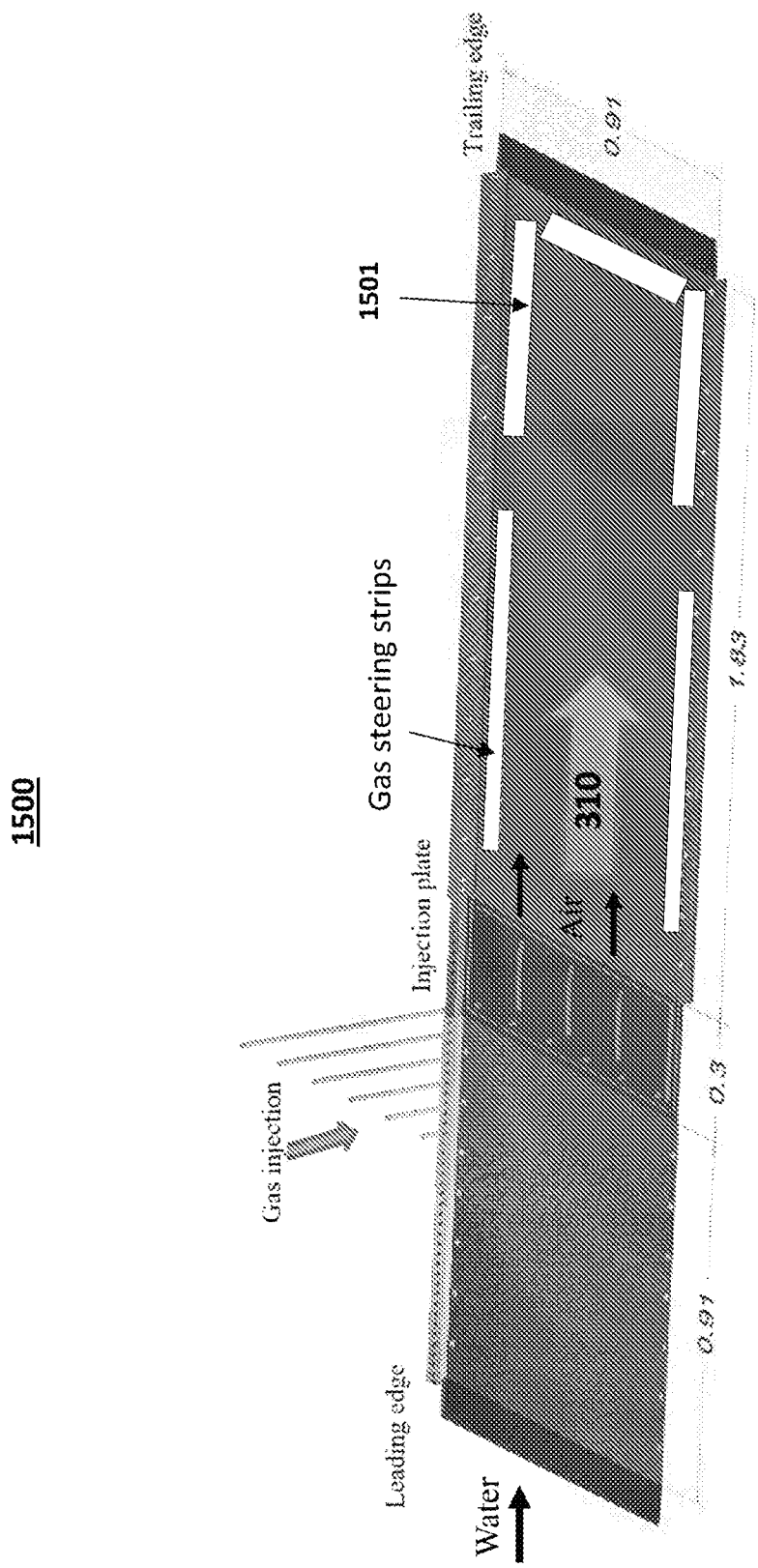
FIG. 15-FIG. 17 depict examples of mechanisms for recovering a portion of an air layer traversing over a plate having an air layer drag reduction technology and super hydrophobic surface drag reduction technology, in accordance with some example embodiments.
Figure 16:
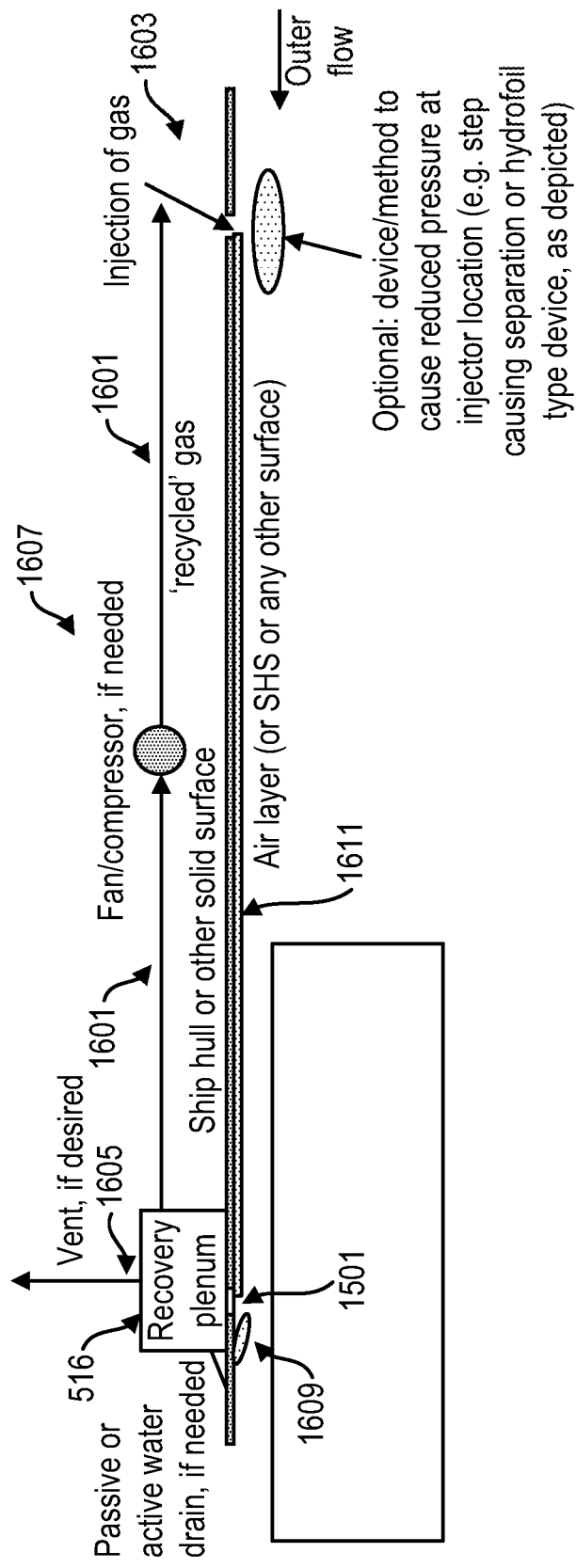
Figure 17:
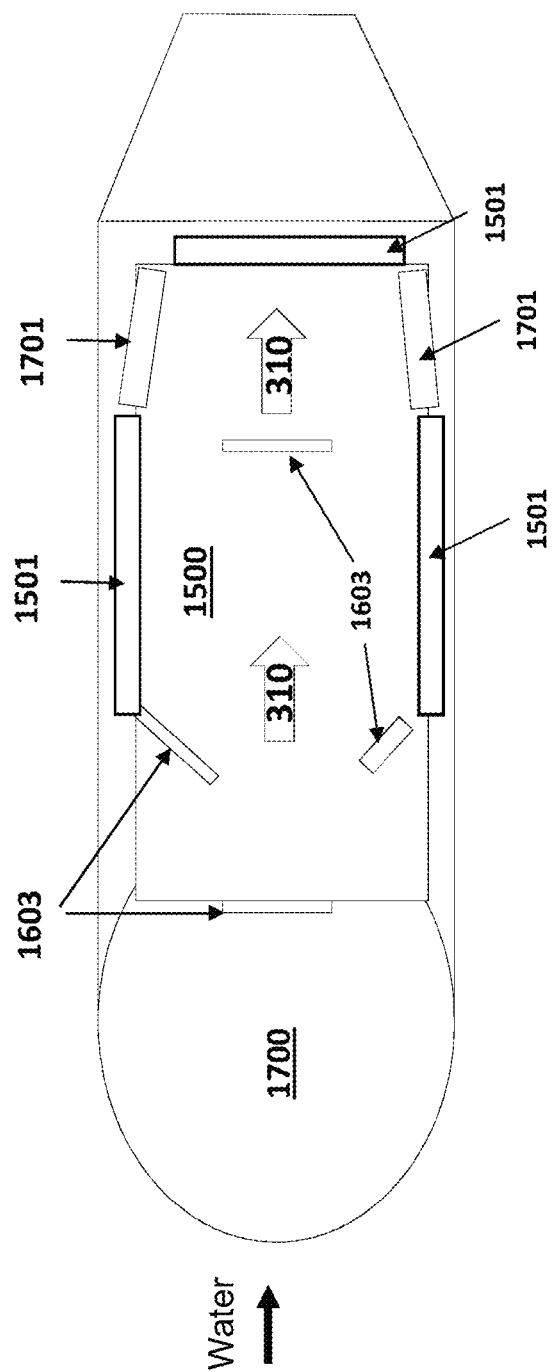

FIG. 15-FIG. 17 depict mechanisms arranged for recovering a portion of an air layer traversing over a plate having an air layer drag reduction technology and super hydrophobic surface drag reduction technology, in accordance with some example embodiments.

FIG. 15 depicts an example of a plate 1500, in accordance with some example embodiments. In the example of FIG. 15, the plate 1500 includes gas/air recovery features that may be implemented on a plate such as plate 300 of FIG. 3. The plate 1500 may include preferential gas recovery inlets/routes 1501, which may be before, on, or after the plate 1500, leading to a recovery plenum 516 for capturing some of the air layer 310 traversing over the plate 1500. The recovery inlets 1501 may include slots, channels, pores, grooves, holes, and the like, which may be at such locations on or near the plate to allow for maximum recovery of the gas without interfering with the gas layer lubricating the surface of the plate 1500.

In some examples, the entrainment of the gas may be achieved by having plate surfaces with varying properties including SHS or by the geometry of the recovery inlets. In an example, the inlets may be angled slits of the same or different size such that any liquid impacting the slits may be pushed out. In an example where the recovery inlets may include holes or pores of the same or different size, the SHS surface properties and surface tension may prevent all or portion of the liquid from entering the recovery plenum 516 to recover some of the gas layer.

FIG. 16 shows an example implementation of the plate 1500, in accordance with some example embodiments. In some examples, the recovery plenum 516 may include passive or active mechanisms to drain any liquid that may enter the recovery plenum 516. For example, the drainage may be via angled exit drain slots, or the drainage may be assisted by hydrostatic forces by having tall recovery plenum 516 with gas recovery from a higher point, or pump assisted drainage.

In some examples, passive or active mechanisms may direct the recovered gas from the recovery plenum 516, via a channel 1601 coupled to the recovery plenum 516, to one or more gas injectors 1603 or to other locations for reuse or discarding. Some of the recovered gas may be returned to an injector from which the gas was recovered from, or it may be returned to other injectors to reduce the required piping to deliver the recovered gas. For example, recovered gas at a recovery plenum 516 near the rear of the ship may be returned to an injector at mid-ship instead of returning it to an injector farther away, e.g., near the front of the ship.

In an example of a passive mechanism, the recovered gas in the recovery plenum 516 may be at a higher pressure than the pressure at a target location such as a gas injector 1603. In another example, the pressure at an injector 1603 may be lowered (e.g., by hydrofoil type devices to create a flow separation region at the injector or a venturi-type ventilator within the injector) so that the recovered gas at the recovery plenum 516 may flow to the injector 1603. In an example, the recovery plenum 516 may include a mechanism 1605, such as a pressure valve, to vent some of the recovered gas to ambient or another location.

In an example, an active mechanism 1607 such as a fan, a blower, a compressor, a pump and the like may direct the recovered gas from the recovery plenum 516, via the channel 1601, to an injector 1603 and/or a target location such as the air tank 505 in FIG. 5. In another example, a flow of new gas, provided by a pump or a blower such as 1607 or by the air tank 505, may cause some of the recovered gas in the recovery plenum 516 to flow and combine with the new gas directed to the injector 1603. In an example, a pressure latch 1609, or other local flow pattern modifying device, may be configured to provide a resistance to air layer 1611 causing an increase in the fraction of or a pressure of the air in the air layer 1611 being recovered by the inlet 1501. For example, the latch/other 1609 may be lowered into the flow of the air layer 1611 to increase the pressure of the air layer being recovered by the inlet 1501.

FIG. 17 depicts an example of the air injection plate 1500 implemented at the bottom of a ship hull 1700 making contact with the water flow. As shown, the plate 1500 includes gas injectors 1603, gas recovery inlets 1501, and gas steering guides/strips 1701 (e.g., physical strake, engineered surface, surface shape, and the like). In an example, the gas steering guides 1701 may guide some of the gas layer 310 to one or more gas recovery inlets 1501 or may allow some of the gas layer 310 to exit the plate 1500 area. In some examples, arrangements with similar features as in FIG. 15-FIG. 17 may be implemented to separate and/or recover gas from a tank, a pipeline, and/or in multiphase flow systems with two or more phases where at least one phase is liquid. In some examples, similar features as in FIG. 15-FIG. 17, including suitable surfaces and materials, may be implemented in a multiphase fluid-fluid flow (e.g. without a gas flow) to separate one fluid from a flow including one or more other fluids. For example, a surface including an appropriate material, coating, roughness, recovery inlets, steering guides, and the like may separate and recover the oil portion from an oil-water flow. In some examples, the surface may include oleophobic, oleophilic, hydrophilic, and/or hydrophobic surfaces.

Without in any way limiting the scope, interpretation, or application of the claims appearing below, a technical effect of one or more of the example embodiments disclosed herein may be reduced drag on a surface, such as a ship's surface, although other technical effects may be found as well. Without in any way limiting the scope, interpretation, or application of the claims appearing below, a technical effect of one or more of the example embodiments disclosed herein may be controlling the flow of a gas on a surface. The gas may be injected, entrained, or resulting from cavitation or boiling, as may be case in, for example, pumps or industrial plants. Without in any way limiting the scope, interpretation, or application of the claims appearing below, a technical effect of one or more of the example embodiments disclosed herein may be a guided or preferential path of gas or liquid-in-liquid on surface.

Some of the effects discovered herein may be in the context of combined macroscopic air layer and super hydrophobic drag reduction, may have applications in numerous industrial applications, and may, for example, be used to reduce the amount of entrained gas making it to cooling water intakes.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phrase "such as" means "such as for example" unless otherwise indicated.

What is claimed:

1. A system comprising:
an engineered surface comprising a hydrophobic layer over at least a portion of the engineered surface;
an air injector configured to inject an air layer formed over at least the portion of the engineered surface having the hydrophobic layer, wherein the air layer is formed with a reduced gas flux caused by the hydrophobic layer over at least the portion of the engineered surface, wherein the air layer, which is formed, is a macroscopic air layer that is a continuous air layer that provides a frictional drag reduction, wherein the macroscopic air layer is formed at a gas flux that is less when compared to a surface not having hydrophobic properties, and wherein the macroscopic air layer comprises at least 1 millimeter of thickness;
an inlet on the engineered surface, the inlet recovering a portion of the air layer;
a plenum coupled to the inlet to collect the portion of the air layer recovered by the inlet; and
a channel coupled to an output of the plenum and coupled to an input of the air injector configured to inject at least the portion of the air layer formed with the reduced gas flux caused by the hydrophobic layer over at least the portion of the engineered surface.

2. The system of claim 1, wherein the engineered surface comprises a microscopic structure, a macroscopic structure, and/or a coating to provide a hydrophobic surface.

3. The system of claim 1, wherein the air layer comprises a patchy air layer.

4. The system of claim 1, wherein the engineered surface comprises a hydrophilic, hydrophobic and/or super hydrophobic surface.

5. The system of claim 1, wherein the engineered surface is configured on a ship's hull below a water line of the ship's hull, an inlet, on a fin, in a duct, and/or a turbine blade.

6. The system of claim 1, wherein the engineered surface is flat.

7. The system of claim 1, wherein the engineered surface is curved.

8. The system of claim 1, further comprising:
a drain at the plenum for draining liquid from inside the plenum.

9. The system of claim 1, further comprising:
a latch adjacent to the inlet, the latch, when lowered into the air layer over at least the portion of the engineered surface, increasing a pressure of air, in the air layer, being recovered by the inlet.

10. The system of claim 1, wherein the inlet includes a slot, a pore, a groove, and/or a hole.

11. The system of claim 1, wherein the inlet includes hydrophilic, hydrophobic and/or hydrophilic surfaces.

12. The system of claim 1, wherein the channel is coupled to an input of an air tank, the air tank storing at least a portion of the air layer recovered by the inlet.

13. The system of claim 1, wherein the channel routes, at least a portion of the air layer recovered by the inlet, to the air injector based on a difference in a pressure at the plenum and a pressure at the air injector.

14. The system of claim 1, wherein the channel routes, by a fan, a blower, and/or a pump, to the air injector at least a portion of the air layer recovered by the inlet.

15. The system of claim 1, further comprising:
a guide to steer the air layer away from, or toward, the inlet.

16. A method comprising:
forming an air layer over at least a portion of an engineered surface comprising a hydrophobic layer over at least a portion of the engineered surface, wherein the air layer is formed with a reduced gas flux caused by the hydrophobic layer over at least the portion of the engineered surface, wherein the air layer, which is formed, is a macroscopic air layer that is a continuous air layer that provides a frictional drag reduction, wherein the macroscopic air layer is formed at a gas flux that is less when compared to a surface not having hydrophobic properties, and wherein the macroscopic air layer comprises at least 1 millimeter of thickness;
recovering a portion of the air layer via an inlet on the engineered surface; collecting the portion of the air layer, recovered by the inlet, in a plenum coupled to the inlet; and
routing at least a portion of the air layer, recovered by the inlet, via a channel coupled to an output of the plenum and coupled to an input of an injector configured to inject at least the portion of the air layer formed with the reduced gas flux caused by the hydrophobic layer over at least the portion of the engineered surface.

17. The method of claim 16, further comprising:
increasing a pressure of air, in the air layer, being recovered by the inlet by lowering a latch, adjacent to the inlet, into the air layer over at least the portion of the engineered surface.

18. The method of claim 16, further comprising:
routing, via the channel at least a portion of the air layer recovered by the inlet, to an air injector based on a difference in a pressure at the plenum and a pressure at the air injector.

19. The system of claim 1, wherein the engineered surface is located at a pipe, an inlet, a tank, or other portion of a chemical plant and/or a power plant.

* * * * *